(12) United States Patent
Dai et al.

(10) Patent No.: US 10,962,740 B2
(45) Date of Patent: *Mar. 30, 2021

(54) CAMERA LENS ASSEMBLY

(71) Applicant: Zhejiang Sunny Optical Co., Ltd, Ningbo (CN)

(72) Inventors: Fujian Dai, Ningbo (CN); Jianke Wenren, Ningbo (CN); Lingbo He, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 460 days.

This patent is subject to a terminal disclaimer.

(21) Appl. No.: 16/067,108

(22) PCT Filed: Sep. 20, 2017

(86) PCT No.: PCT/CN2017/102428
§ 371 (c)(1),
(2) Date: Jun. 28, 2018

(87) PCT Pub. No.: WO2018/214349
PCT Pub. Date: Nov. 29, 2018

(65) Prior Publication Data
US 2021/0048623 A1    Feb. 18, 2021

(30) Foreign Application Priority Data

May 22, 2017   (CN) .......................... 201710362676.9
May 22, 2017   (CN) .......................... 201720570321.4

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS 9,297,983 B2   3/2016 Kubota
2016/0033742 A1   2/2016 Huang
(Continued)

FOREIGN PATENT DOCUMENTS

CN          104597582          5/2015

OTHER PUBLICATIONS

Dai, "Camera Lens", CN104597582, machine translation (Year: 2015).*

*Primary Examiner* — Wen Huang
(74) *Attorney, Agent, or Firm* — Hauptman Ham, LLP

(57) ABSTRACT

The present disclosure discloses a camera lens assembly, the camera lens assembly having a total effective focal length f and an entrance pupil diameter EPD, and including sequentially, from an object side to an image side along an optical axis, a first lens, a second lens, a third lens, a fourth lens, a fifth lens, a sixth lens and a seventh lens. Each of the first lens and the sixth lens has a positive refractive power; each of the second lens, the third lens, the fifth lens and the seventh lens has a positive refractive power or a negative refractive power; and the fourth lens has a negative refractive power, an object-side surface of the fourth lens is a concave surface, and an image-side surface of the fourth lens is a convex surface. The total effective focal length f and the entrance pupil diameter EPD satisfy: $f/EPD \leq 1.7$.

11 Claims, 14 Drawing Sheets

(56) References Cited

U.S. PATENT DOCUMENTS

2016/0124191 A1 5/2016 Hashimoto
2016/0299319 A1 10/2016 Tang et al.
2017/0045714 A1 2/2017 Huang
2017/0199350 A1 7/2017 Teraoka
2018/0239115 A1* 8/2018 Hsu ......................... G02B 9/64

* cited by examiner

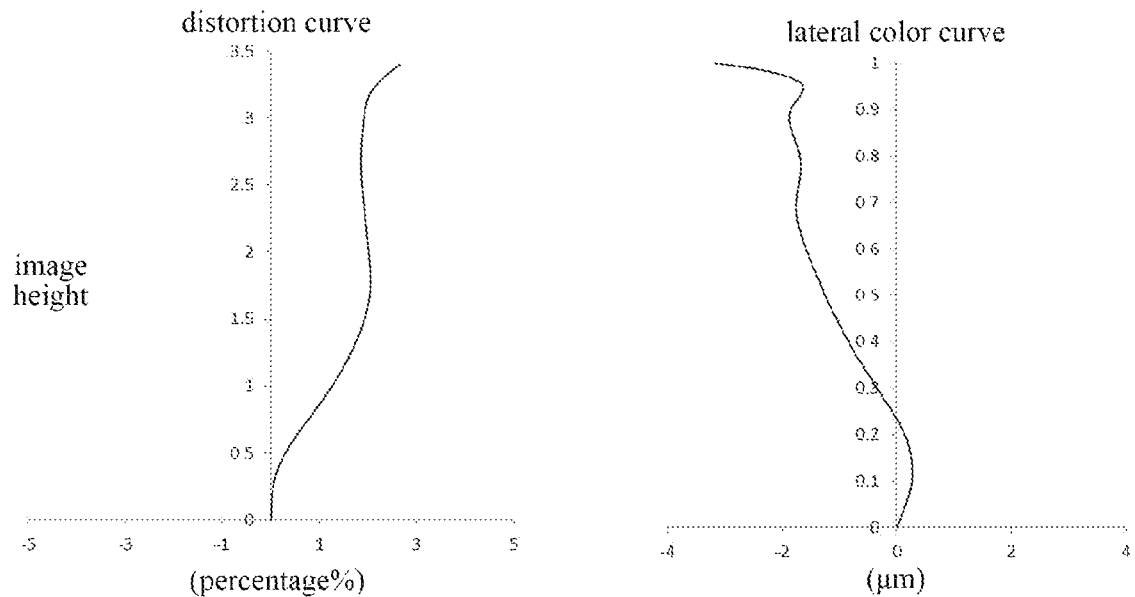
Fig. 6C
Fig. 6D
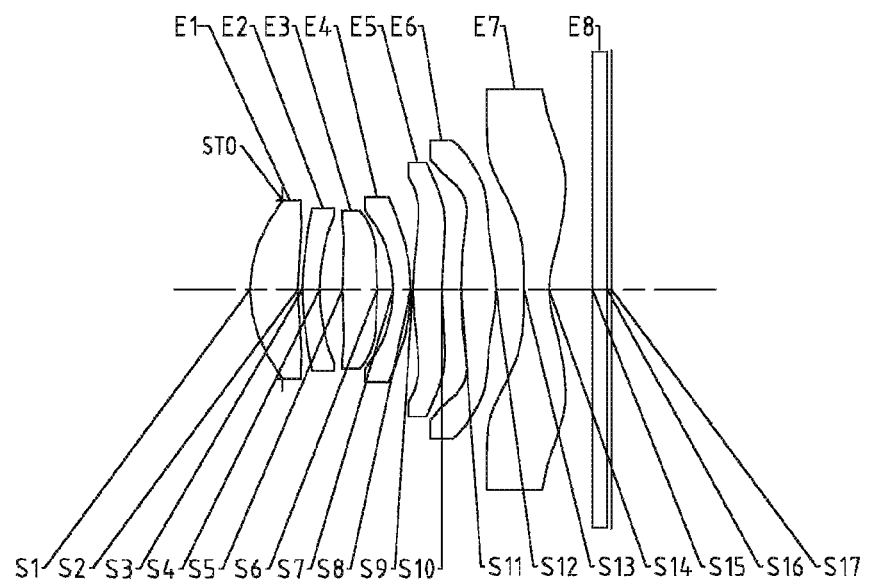
Fig. 7

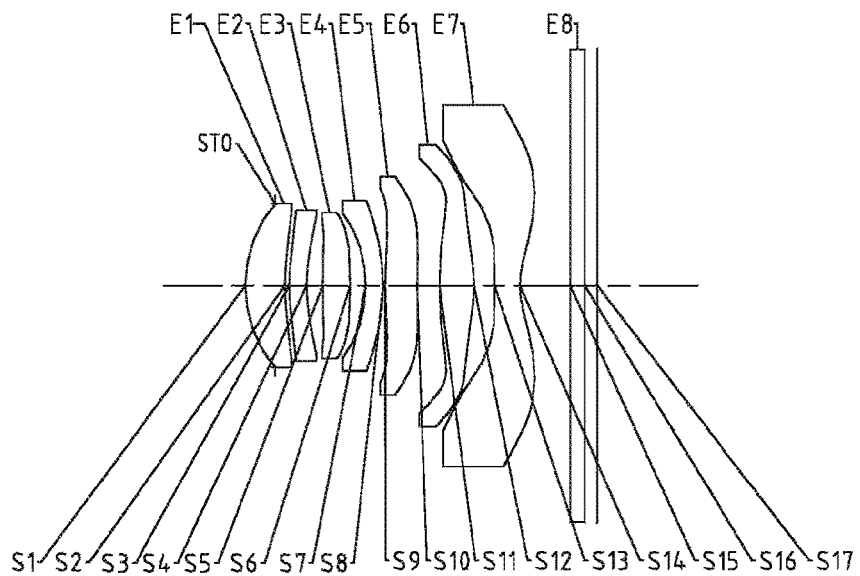
Fig. 9
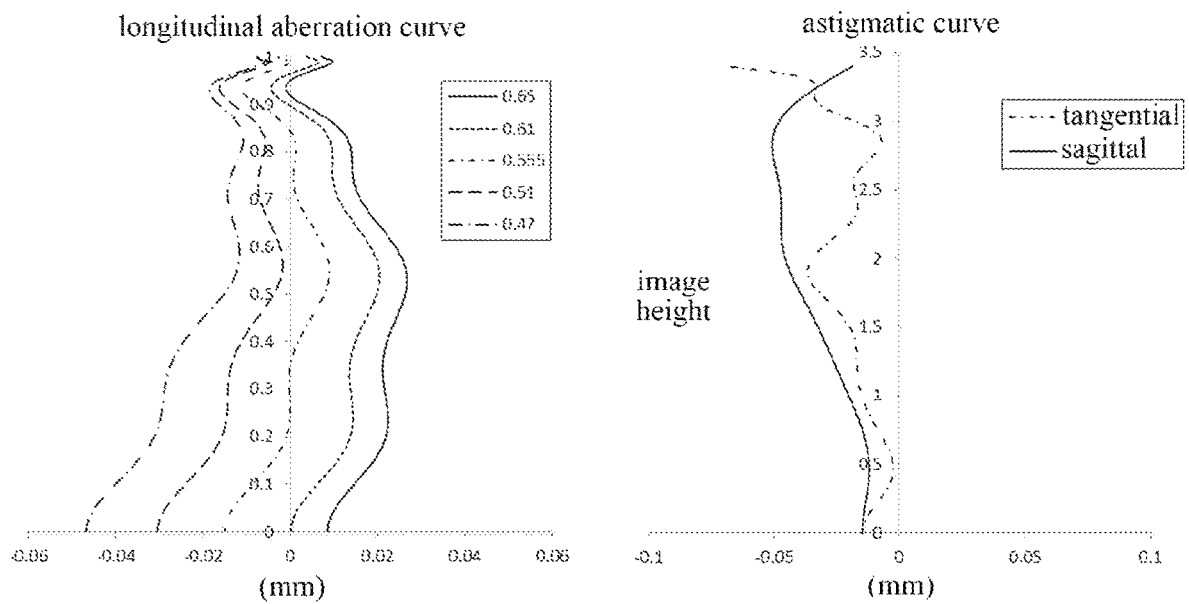
Fig. 10A
Fig. 10B

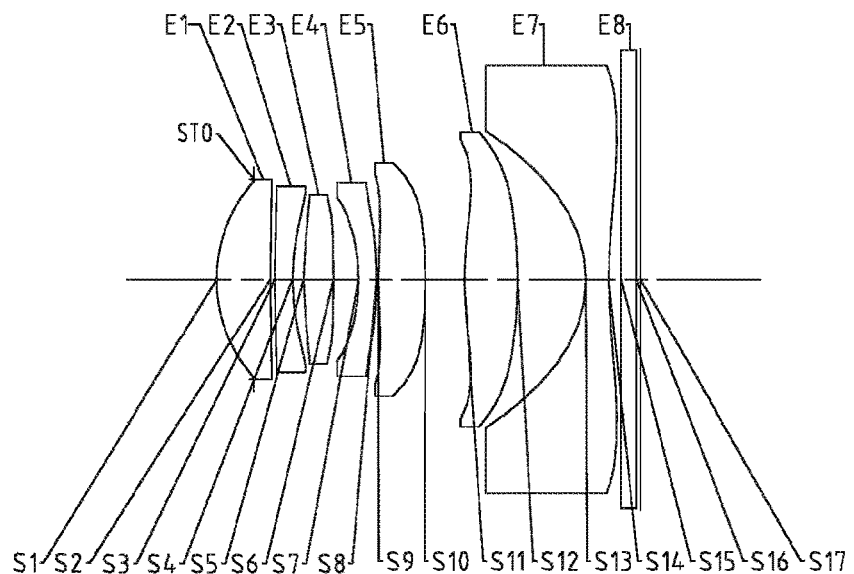
Fig. 13
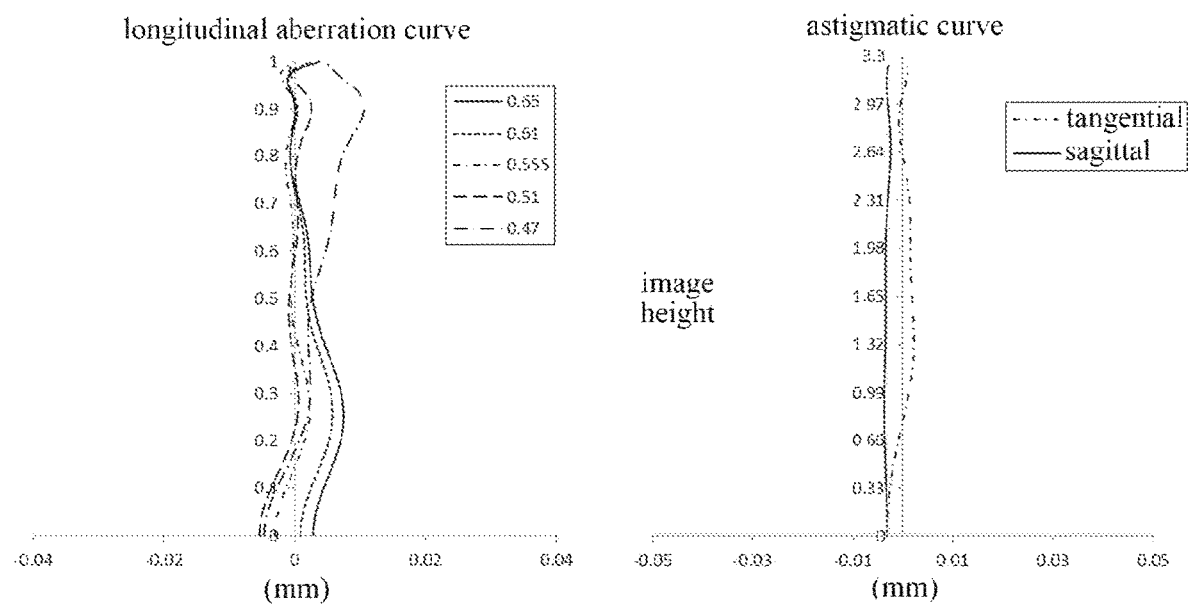
Fig. 14A
Fig. 14B

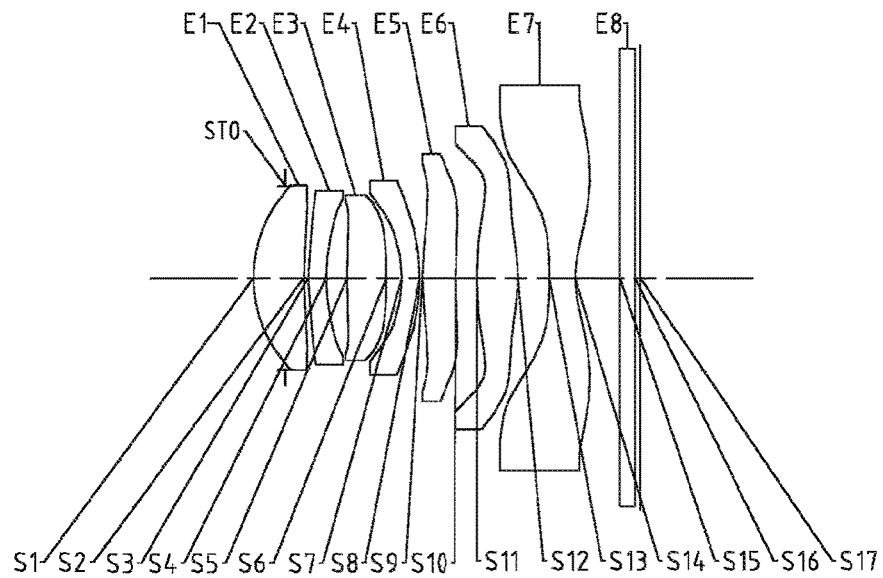
Fig. 17
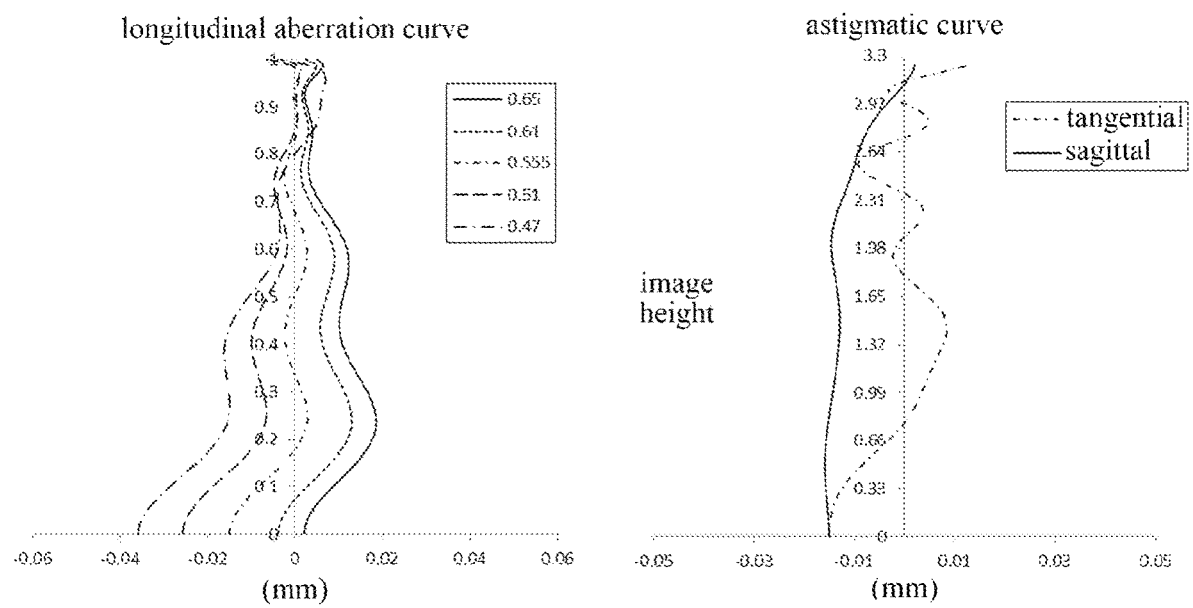
Fig. 18A
Fig. 18B

CAMERA LENS ASSEMBLY

RELATED APPLICATIONS

The present application is a National Phase of International Application Number PCT/CN2017/102428, filed Sep. 20, 2017, and claims the priority of China Application No. 201710362676.9, filed May 22, 2017; and China Application No. 201720570321.4, filed May 22, 2017.

TECHNICAL FIELD

The present disclosure relates to a camera lens assembly, and specifically to a camera lens assembly including seven lenses.

BACKGROUND

In recent years, with the development of science and technology, portable electronic products are gradually emerging, and portable electronic products having camera functions are increasingly liked by people. Therefore, there is an increasing market demand for camera lens assemblies suitable for the portable electronic products. Since the portable electronic products tend to be miniaturized, a total length of a lens assembly is limited, thereby increasing the difficulty in designing the lens assembly. Currently, an often used photosensitive element in a camera lens assembly is generally a CCD (charge-coupled device) or CMOS (complementary metal-oxide semiconductor). As the CCD and CMOS elements are having higher performances and smaller sizes, higher requirements for the high image quality and miniaturization of the camera lens assemblies matching with the portable electronic products have been brought forward.

To satisfy the miniaturization requirement, a typical configuration of an existing lens assembly has an F-number (effective focal length of a lens assembly/entrance pupil diameter of a lens assembly) of 2.0 or above, to possess a good optical performance while the reduction of the size of the lens assembly is achieved. However, with the constant development of smart phones and other portable electronic products, higher requirements for camera lens assemblies are brought forward, especially in the situations such as lack of light (e.g., cloudy and rainy days, dusk, etc.) and hand trembling, thus the F-number of 2.0 or above has been unable to meet higher-order imaging requirements.

Therefore, there is a need for a camera lens assembly applicable to the portable electronic products and having a large ultra-thin aperture, an excellent image quality and a low sensitivity.

SUMMARY

The technical solution provided by the present disclosure at least partially solves the technical problems described above.

According to an aspect, the present disclosure provides a camera lens assembly, the camera lens assembly having a total effective focal length f and an entrance pupil diameter EPD, and including sequentially, along an optical axis from an object side to an image side, a first lens, a second lens, a third lens, a fourth lens, a fifth lens, a sixth lens and a seventh lens. Each of the first lens and the sixth lens has a positive refractive power; each of the second lens, the third lens, the fifth lens and the seventh lens has a positive refractive power or a negative refractive power; and the fourth lens has a negative refractive power, an object-side surface of the fourth lens is a concave surface, and an image-side surface of the fourth lens is a convex surface. The total effective focal length f of the camera lens assembly and the entrance pupil diameter EPD of the camera lens assembly may satisfy: f/EPD≤1.7.

In the present disclosure, multiple pieces (for example, seven pieces) of lenses are used. By properly allocating the relationship between the total effective focal length and the entrance pupil diameter of the camera lens assembly, the system has a large-aperture advantage in the process of increasing an amount of light admitted, thereby enhancing an image effect in a dark environment. At the same time, aberrations of the edge field are reduced.

According to another aspect, the present disclosure provides a camera lens assembly, the camera lens assembly having a total effective focal length f and an entrance pupil diameter EPD, and including sequentially, along an optical axis from an object side to an image side, a first lens, a second lens, a third lens, a fourth lens, a fifth lens, a sixth lens and a seventh lens. Each of the first lens and the sixth lens has a positive refractive power; each of the second lens, the third lens, the fifth lens and the seventh lens has a positive refractive power or a negative refractive power; and the fourth lens has a negative refractive power, an object-side surface of the fourth lens is a concave surface, and an image-side surface of the fourth lens is a convex surface. The total effective focal length f of the camera lens assembly and an effective focal length f5 of the fifth lens may satisfy: 0<<f/f5<<1.0.

In an implementation, a distance TTL from an object-side surface of the first lens to an image plane of the camera lens assembly on the optical axis and half of a diagonal length ImgH of an effective pixel area on the image plane of the camera lens assembly may satisfy: TTL/ImgH≤1.85.

In an implementation, the object-side surface of the first lens may be a convex surface, and an image-side surface of the first lens may be a concave surface; an object-side surface of the second lens may be a convex surface, and an image-side surface of the second lens may be a concave surface; and an object-side surface and an image-side surface of the sixth lens may both be convex surfaces at a paraxial position.

In an implementation, the total effective focal length f of the camera lens assembly and an effective focal length f1 of the first lens may satisfy: 0.5≤f/f1≤1.0.

In an implementation, the total effective focal length f of the camera lens assembly and the effective focal length f5 of the fifth lens may satisfy: 0<<f/f5<<1.0.

In an implementation, the total effective focal length f of the camera lens assembly and an effective focal length f7 of the seventh lens may satisfy: −2<<f/f7<<0.

In an implementation, the effective focal length f1 of the first lens and an effective focal length f3 of the third lens may satisfy: 0<<f1/f3<<1.0.

In an implementation, the effective focal length f1 of the first lens and an effective focal length f4 of the fourth lens may satisfy: −1.0<f1/f4<<0.

In an implementation, an effective focal length f6 of the sixth lens and the effective focal length f7 of the seventh lens may satisfy: −2.5<<f6/f7≤−1.0.

In an implementation, a center thickness CT5 of the fifth lens and a center thickness CT6 of the sixth lens may satisfy: 0.5<<CT5/CT6≤1.0.

In an implementation, an air spacing T23 between the second lens and the third lens on the optical axis and a center thickness CT3 of the third lens may satisfy: 0<T23/CT3<1.0.

In an implementation, a radius of curvature R3 of the object-side surface of the second lens and a radius of curvature R8 of the image-side surface of the fourth lens may satisfy: −1.5<R3/R8<0.

In an implementation, a radius of curvature R4 of the image-side surface of the second lens and a radius of curvature R7 of the object-side surface of the fourth lens may satisfy: −1.5<R4/R7<−0.5.

In an implementation, the radius of curvature R7 of the object-side surface of the fourth lens and the radius of curvature R8 of the image-side surface of the fourth lens may satisfy: |(R7−R8)/(R7+R8)|<1.0.

The camera lens assembly with the above configuration may further have at least one of the beneficial effects of miniaturization, a low sensitivity, a good assembling technology and a high image quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIGS. 6A-6D respectively illustrate a longitudinal aberration curve, an astigmatic curve, a distortion curve and a lateral color curve of the camera lens assembly according to embodiment 3;

FIG. 7 is a schematic structural diagram illustrating a camera lens assembly according to embodiment 4 of the present disclosure;

FIG. 9 is a schematic structural diagram illustrating a camera lens assembly according to embodiment 5 of the present disclosure;

FIGS. 10A-10D respectively illustrate a longitudinal aberration curve, an astigmatic curve, a distortion curve and a lateral color curve of the camera lens assembly according to embodiment 5;

FIG. 13 is a schematic structural diagram of a camera lens assembly according to embodiment 7 of the present disclosure;

FIGS. 14A-14D respectively illustrate a longitudinal aberration curve, an astigmatic curve, a distortion curve and a lateral color curve of the camera lens assembly according to embodiment 7;

FIG. 17 is a schematic structural diagram illustrating a camera lens assembly according to embodiment 9 of the present disclosure; and FIGS. 18A-18D respectively illustrate a longitudinal aberration curve, an astigmatic curve, a distortion curve and a lateral color curve of the camera lens assembly according to embodiment 9.

DETAILED DESCRIPTION OF EMBODIMENTS

Figure 1:
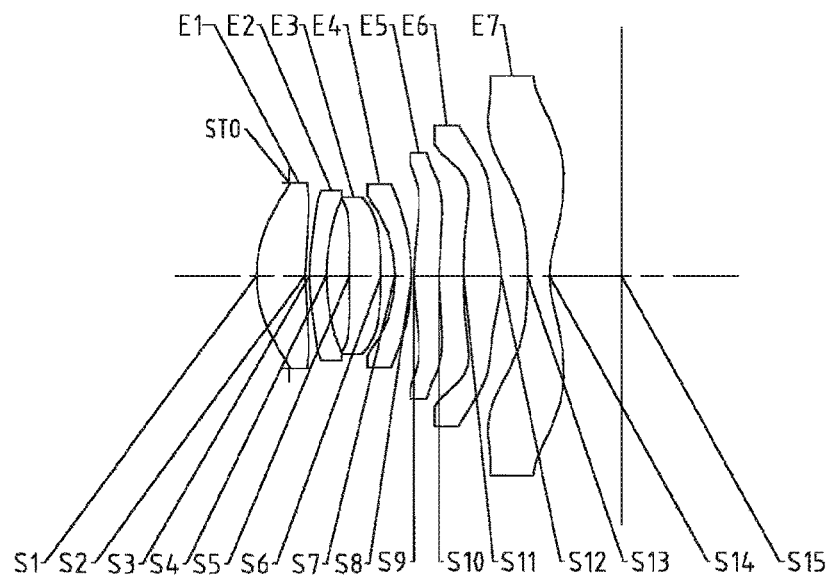
FIG. 1 is a schematic structural diagram illustrating a camera lens assembly according to embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals refer to the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thickness, size and shape of the lens have been slightly exaggerated for the convenience of explanation. Specifically, shapes of spherical surfaces or aspheric surfaces shown in the accompanying drawings are shown by way of example. That is, shapes of spherical surfaces or aspheric surfaces are not limited to the shapes of the spherical surfaces or the aspheric surfaces shown in the accompanying drawings. The accompanying drawings are merely illustrative and not strictly drawn to scale.

In addition, the paraxial area refers to an area near the optical axis. In this text, the surface closest to the object in each lens is referred to as the object-side surface, and the surface closest to the image plane in each lens is referred to as the image-side surface.

It should be further understood that the terms "comprising," "including," "having" and variants thereof, when used in this specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of features, modify the entire list of features rather than an individual element in the list. Further, the use of "may," when describing implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles and other aspects of the present disclosure will be described in detail below.

A camera lens assembly according to exemplary implementations of the present disclosure has, for example, seven lenses, i.e., a first lens, a second lens, a third lens, a fourth lens, a fifth lens, a sixth lens, and a seventh lens. The seven lenses are arranged in sequence from an object side to an image side along an optical axis.

In the exemplary implementations, the first lens may have a positive refractive power; the second lens may have a positive refractive power or a negative refractive power; the third lens may have a positive refractive power or a negative refractive power; the fourth lens may have a negative refractive power, an object-side surface of the fourth lens may be a concave surface, and an image-side surface of the fourth lens may be a convex surface; the fifth lens may have a positive refractive power or a negative refractive power; the sixth lens may have a positive refractive power; and the seventh lens may have a positive refractive power or a negative refractive power.

In addition, an object-side surface of the first lens may be a convex surface, and an image-side surface of the first lens may be a concave surface; an object-side surface of the second lens may be a convex surface, and an image-side surface of the second lens may be a concave surface; and an object-side surface of the sixth lens may be a convex surface at a paraxial position, and an image-side surface of the sixth lens may be a convex surface at a paraxial position. This arrangement is advantageous in reducing aberrations of the edge field in the process of increasing an amount of light admitted. The allocation of the first lens facilitates the dispersion of a positive refractive power, avoids the excessive concentration of the refractive power, and at the same time may effectively reduce a chromatic spherical aberration and a longitudinal chromatic aberration.

A total effective focal length f of the camera lens assembly and an entrance pupil diameter EPD of the camera lens assembly according to the exemplary implementations of the present disclosure may satisfy: $f/EPD \leq 1.7$, and more specifically, f and EPD may further satisfy: $1.53 \leq f/EPD \leq 1.55$. By allocating the camera lens assembly to satisfy: $f/EPD \leq 1.7$, the system may have a large-aperture advantage in the process of increasing an amount of light admitted, thus enhancing an image effect in a dark environment while reducing the aberrations of the edge field.

The reduction of the f-number Fno (f/EPD) can effectively increase the brightness of the image plane so that the lens assembly can meet the shooting requirements better when the light is insufficient (e.g., night, cloudy and rainy days, dusk, etc.). The reduction of the f-number Fno in a small numerical range can produce a better effect in terms of increasing the brightness, highlighting the focal point, and blurring the background. The lens assembly of Fno1.8 has been used in the existing technology, but it cannot be further reduced due to restrictions from other factors. However, in the present disclosure, this parameter may be further reduced to 1.7. Although Fno1.7 and Fno1.8 differ slightly in numerical values, the lens assembly having the parameter of Fno1.7 exceeds about 12% in energy ratio of the image plane than the lens assembly having the parameter of Fno1.8, which can effectively improve the brightness of the image plane and meet the night shooting requirements better. In addition, compared with Fno1.8, the lens assembly having the parameter of Fno1.7 has a shorter depth of field. For example, the depth of field of the lens assembly having the parameter of Fno1.7 is about 7% smaller than the depth of field of the lens assembly having the parameter of Fno1.8, when shooting an object 2 meters away simultaneously, thus enabling a user to have better experience in highlighting the focal point and blurring the background. That is, although Fno1.7 and Fno1.8 differ only by 0.1 in numerical values, the lens assembly having the parameter of Fno1.7 is significantly superior to the lens assembly having the parameter of Fno1.8 in terms of practical technical effects.

A distance TTL from the object-side surface of the first lens to an image plane of the camera lens assembly on the optical axis and half of a diagonal length ImgH of an effective pixel area on the image plane of the camera lens assembly may satisfy: $TTL/ImgH \leq 1.85$, and more specifically, TTL and ImgH may further satisfy: $1.47 \leq TTL/ImgH \leq 1.85$. In this way, the total size of the camera lens assembly may be effectively compressed, thus achieving an ultra-thin characteristic and miniaturization of the camera lens assembly.

To be able to effectively enlarge the field-of-view angle of the lens assembly, correct aberrations, reduce the sensitivity of the optical system, and improve the image quality of the lens assembly, the effective focal lengths of the lenses may be properly allocated.

The total effective focal length f of the camera lens assembly and an effective focal length f1 of the first lens may satisfy: $0.5 \leq f/f1 \leq 1.0$, and more specifically, f and f1 may further satisfy: $0.52 \leq f/f1 \leq 0.97$. For a lens assembly with its first lens having a positive refractive power, the back focal length of the lens assembly is not easy to be long. When the absolute value of the ratio of f/f1 is too small, it is not conducive to achieving a large field-of-view angle and a long back focus length. When the absolute value of the ratio of f/f1 is too large, a larger aberration will be introduced, and at the same time the difficulty in manufacturing the lenses is increased.

The total effective focal length f of the camera lens assembly and an effective focal length f5 of the fifth lens may satisfy: $0 < f/f5 < 1.0$, and more specifically, f and f5 may further satisfy: $0.19 \leq f/f5 \leq 0.56$. If the focal length of the fifth lens is too long, the effect of correcting the aberrations is not achieved, and if the focal length is too short, it is not favorable for processing. A lens assembly satisfying $0 < f/f5 < 1.0$ may simultaneously take into account a good image quality and a good technology.

The total effective focal length f of the camera lens assembly and an effective focal length f7 of the seventh lens may satisfy: $-2<f/f7<0$, and more specifically, f and f7 may further satisfy: $-1.80 \leq f/f7 \leq -1.30$. Allocating the total effective focal length f of the camera lens assembly and the effective focal length f7 of the seventh lens properly is conductive to shortening the total track length of the optical system and at the same time facilitates the correction of the aberrations.

The effective focal length f1 of the first lens and an effective focal length f3 of the third lens may satisfy: $0<f1/f3<1.0$, and more specifically, f and f3 may further satisfy: $0.34 \leq f1/f3 \leq 0.75$. When the ratio of f1/f3 is too large, the first lens needs to bear too many refractive powers, which results in the poor technology and is not conductive to correcting the aberrations. When the ratio of f1/f3 is too small, the aperture of the third lens is not easy to be enlarged, resulting in a poor assembling technology. When $0<f1/f3<1.0$, the technology of the lens and the assembling technology may be effectively ensured.

The effective focal length f1 of the first lens and an effective focal length f4 of the fourth lens may satisfy: $-1.0 \leq f1/f4<0$, and more specifically, f1 and f4 may further satisfy: $-0.98 \leq f1/f4 \leq -0.13$. Allocating the refractive powers of the first lens and the fourth lens properly may effectively reduce the aberrations of the entire system and reduce the sensitivity of the system.

An effective focal length f6 of the sixth lens and the effective focal length f7 of the seventh lens may satisfy: $-2.5<f6/f7 \leq -1.0$, and more specifically, f6 and f7 may further satisfy: $-2.18 \leq f6/f7 \leq -1.04$. The cooperation of the sixth lens and the seventh lens may correct chromatic aberrations of the system. When the ratio of f6/f7 is too large, it is not conductive to correcting the chromatic aberrations. When the ratio of f6/f7 is too small, it is not favorable for the technology of the sixth lens. When $-2.5<f6/f7-1.0$, both of the aspects of the image quality and the technology of the lens assembly may be effectively taken into account.

In the application, the center thickness of each lens and the air spacing between the lenses on the optical axis may also be properly arranged. For example, a center thickness CT5 of the fifth lens and a center thickness CT6 of the sixth lens may satisfy: $0.5<CT5/CT6 \leq 1.0$, and more specifically, CT5 and CT6 may further satisfy: $0.64 \leq CT5/CT6 \leq 0.97$. When the ratio of CT5/CT6 is too large, it is not conducive to eliminating chromatic aberrations. When the ratio of CT5/CT6 is too small, the fifth lens will be too thin, resulting in a poor technology. When $0.5<CT5/CT6 \leq 1.0$, both the chromatic aberrations and the technology may be effectively balanced. As another example, an air spacing T23 between the second lens and the third lens on the optical axis and a center thickness CT3 of the third lens may satisfy: $0<T23/CT3<1.0$, and more specifically, T23 and CT3 may further satisfy: $0.37 \leq T23/CT3 \leq 0.77$. When the ratio of T23/CT3 is too large, it is not conducive to the miniaturization of the system. When the ratio of T23/CT3 is too small, there is a risk of forming a ghost image. When $0<T23/CT3<1.0$, both of the aspects of the system miniaturization and the ghost image risk may be effectively balanced.

In addition, the radius of curvature of each mirror surface may be properly allocated. For example, a radius of curvature R3 of the object-side surface of the second lens and a radius of curvature R8 of the image-side surface of the fourth lens may satisfy: $-1.5<R3/R8<0$, and more specifically, R3 and R8 may further satisfy: $-1.39 \leq R3/R8 \leq -0.86$. The cooperation of the second lens and the fourth lens may correct chromatic aberrations of the system. When the ratio of R3/R8 is too large or too small, it is not conducive to the correction of the chromatic aberrations. When $-1.5<R3/R8<0$, the balance between various aberrations may be achieved. As another example, a radius of curvature R4 of the image-side surface of the second lens and a radius of curvature R7 of the object-side surface of the fourth lens may satisfy: $-1.5<R4/R7<-0.5$, and more specifically, $-1.42 \leq R4/R7 \leq -0.83$. Allocating properly the radius of curvature R4 of the image-side surface of the second lens and the radius of curvature R7 of the object-side surface of the fourth lens helps to correct the chromatic aberrations of the system and achieve the balance between various aberrations. As another example, the radius of curvature R7 of the object-side surface of the fourth lens and the radius of curvature R8 of the image-side surface of the fourth lens satisfy: $|(R7-R8)/(R7+R8)|<1.0$, and more specifically, $0.08 \leq |(R7-R8)/(R7+R8)| \leq 0.35$. Allocating properly the radii of curvature of the object-side surface and the image-side surface of the fourth lens helps to correct the aberrations of the entire system.

In the exemplary implementations of the present disclosure, an aperture STO may also be provided between, for example, the object side and the first lens to effectively contract light entering the camera lens assembly, thereby improving the image quality of the lens assembly. It should be understood by those skilled in the art that the aperture STO may be set at other positions as needed, that is, the setting of the aperture STO should not be limited to the positions shown in the embodiments.

The camera lens assembly according to the above implementations of the present disclosure may use multiple lenses, for example, seven lenses described above. By properly allocating the refractive power and surface type of each lens, the center thickness of each lens, the axial spacing between the lenses, etc., it is possible to effectively enlarge the aperture of the camera lens assembly, reduce the system sensitivity, ensure the miniaturization of the lens assembly, and improve the image quality, thus making the camera lens assembly more conducive to the production and processing and applicable to portable electronic products. In the implementations of the present disclosure, at least one of the mirror surfaces of the lenses is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, and has advantages of improving a distortion aberration and improving an astigmatic aberration. Using the aspheric lens, aberrations occurring at the time of imaging can be eliminated as much as possible, thereby improving the image quality of the lens assembly.

However, it should be understood by those skilled in the art that the various results and advantages described in the present specification may be obtained by changing the number of the lenses forming the lens assembly without departing from the technical solution sought to be protected by the present disclosure. For example, although seven lenses are described as an example in the implementations, the camera lens assembly is not limited to include seven lenses. If desired, the camera lens assembly may also include other numbers of lenses.

Specific embodiments of the camera lens assembly that may be applied to the above-described implementations are further described below with reference to the accompanying drawings.

Embodiment 1

A camera lens assembly according to embodiment 1 of the present disclosure is described below with reference to FIGS. 1 to 2D. FIG. 1 is a schematic structural diagram illustrating the camera lens assembly according to embodiment 1 of the present disclosure.

As shown in FIG. 1, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. In the camera lens assembly of the present embodiment, an aperture STO may also be provided to limit light beams in order to improve the image quality of the camera lens assembly. Light from an object passes through the surfaces S1-S14 sequentially and is finally imaged on an image plane S15.

Table 1 shows the surface type, the radius of curvature, the thickness, the material and the conic coefficient of each lens of the camera lens assembly in embodiment 1.

the image-side surface S4 of the second lens E2 and the radius of curvature R7 of the object-side surface S7 of the fourth lens E4 satisfy: R4/R7=−1.38; and the radius of curvature R7 of the object-side surface S7 of the fourth lens E4 and the radius of curvature R8 of the image-side surface S8 of the fourth lens E4 satisfy: |(R7−R8)/(R7+R8)|=0.23.

In the present embodiment, seven lenses are used as an example. By properly allocating the focal length and the surface type of each lens, the aperture of the lens assembly is effectively enlarged, and the total track length of the lens assembly is shortened, thereby ensuring the large aperture and the miniaturization of the lens assembly. At the same time, various types of aberrations are corrected, thereby improving the resolution and the image quality of the lens assembly. The surface type x of each aspheric surface is defined by the following formula:

$$x = \frac{ch^2}{1+\sqrt{1-(k+1)c^2h^2}} + \sum A_i h^i. \tag{1}$$

Here, x is the distance sagittal height to the vertex of the aspheric surface when the aspheric surface is at a position of

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4485 | | | |
| S1 | aspheric | 1.8401 | 0.6693 | 1.55 | 56.1 | 0.7008 |
| S2 | aspheric | 3.8521 | 0.0615 | | | −9.0405 |
| S3 | aspheric | 2.6332 | 0.2300 | 1.66 | 21.0 | −29.4457 |
| S4 | aspheric | 2.4906 | 0.3184 | | | 2.5257 |
| S5 | aspheric | 20.3984 | 0.4368 | 1.55 | 56.1 | 0.1748 |
| S6 | aspheric | −8.6896 | 0.1964 | | | 1.4731 |
| S7 | aspheric | −1.8018 | 0.2300 | 1.66 | 21.0 | 1.0617 |
| S8 | aspheric | −2.8621 | 0.0301 | | | 2.0353 |
| S9 | aspheric | 2.9251 | 0.3583 | 1.61 | 28.7 | 1.7796 |
| S10 | aspheric | 3.7756 | 0.3375 | | | 2.1160 |
| S11 | aspheric | 16.5791 | 0.5217 | 1.55 | 48.3 | −0.7179 |
| S12 | aspheric | −1.6209 | 0.3616 | | | −7.5711 |
| S13 | aspheric | −33.4884 | 0.3052 | 1.54 | 55.8 | −0.1502 |
| S14 | aspheric | 1.2411 | 0.9935 | | | −7.2208 |
| S15 | spherical | infinite | 0 | | | |

As may be obtained from Table 1, the center thickness CT5 of the fifth lens E5 and the center thickness CT6 of the sixth lens E6 satisfy: CT5/CT6=0.69; the air spacing T23 between the second lens E2 and the third lens E3 on the optical axis and the center thickness CT3 of the third lens E3 satisfy: T23/CT3=0.73; the radius of curvature R3 of the object-side surface S3 of the second lens E2 and the radius of curvature R8 of the image-side surface S8 of the fourth lens E4 satisfy: R3/R8=−0.92; the radius of curvature R4 of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the higher-order coefficients $A_4, A_6, A_8, A_{10}, A_{12}, A_{14}, A_{16}$ and $A_{18}$ applicable to the mirror surfaces S1-S14 in embodiment 1.

TABLE 5

| Surface number | A4 | A6 | A8 | A10 | A12 | A14 | A16 | A18 |
|---|---|---|---|---|---|---|---|---|
| S1 | −1.9446E−02 | 1.8787E−02 | −6.0659E−02 | 7.2138E−02 | −5.4789E−02 | 2.1341E−02 | −4.3067E−03 | 0 |
| S2 | −1.0518E−01 | 3.5215E−02 | 7.9487E−02 | −1.5270E−01 | 1.1699E−01 | −4.5084E−02 | 7.0785E−03 | 0 |
| S3 | 3.7322E−02 | −3.0847E−01 | 64488E−01 | −7.2454E−01 | 4.8782E−01 | −1.7827E−01 | 2.8152E−02 | 0 |
| S4 | −7.0612E−02 | −8.5634E−02 | 3.0419E−01 | −5.2379E−01 | 5.7272E−01 | −3.5707E−01 | 9.9431E−02 | 0 |
| S5 | −4.7990E−02 | 2.7173E−02 | −2.3605E−01 | 4.8654E−01 | −6.0083E−01 | 3.8388E−01 | −1.0138E−01 | 0 |
| S6 | −7.3247E−02 | −84803E−02 | 1.5642E−01 | −3.4743E−01 | 3.7351E−01 | −1.8439E−01 | 3.3359E−02 | 0 |

TABLE 5-continued

| Surface number | A4 | A6 | A8 | A10 | A12 | A14 | A16 | A18 |
|---|---|---|---|---|---|---|---|---|
| S7 | 1.1996E-01 | -3.0758E-01 | 5.9990E-01 | -9.0972E-01 | 9.0644E-01 | -4.7901E-01 | 1.0745E-01 | 0 |
| S8 | 2.6017E-02 | -1.3501E-02 | 4.3233E-02 | -1.3072E-01 | 1.5425E-01 | -8.1207E-02 | 1.7034E-02 | 0 |
| S9 | -2.0080E-01 | 2.1662E-01 | -2.1382E-01 | 1.3924E-01 | -6.7592E-02 | 1.9815E-02 | -2.3694E-03 | 0 |
| S10 | -1.1381E-01 | -8.0996E-03 | 6.0884E-02 | -5.2995E-02 | 1.7671E-02 | -1.9276E-03 | -2.4691E-05 | 0 |
| S11 | 9.0061E-02 | -5.7464E-02 | -1.3144E-02 | 3.2192E-02 | -24909E-02 | 7.9341E-03 | -8.6038E-04 | 0 |
| S12 | 8.9992E-02 | 1.1066E-02 | -1.0814E-02 | -1.2657E-02 | 8.7832E-03 | -1.8587E-03 | 1.3320E-04 | 0 |
| S13 | -1.5663E-01 | 8.2344E-02 | -3.9011E-02 | 1.5862E-02 | -4.0456E-03 | 5.9186E-04 | -4.5915E-05 | 1.4710E-06 |
| S14 | -1.0864E-01 | 5.9943E-02 | -2.6496E-02 | 7.9168E-03 | -1.5184E-03 | 1.7686E-04 | -1.1201E-05 | 2.9246E-07 |

Table 3 below shows the effective focal lengths f1 to f7 of the lenses, the total effective focal length f of the camera lens assembly, the total track length TTL of the camera lens assembly (i.e., the distance from the object-side surface S1 of the first lens E1 to the image plane S15 of the camera lens assembly on the optical axis) and the half of the diagonal length ImgH of the effective pixel area on the image plane S15 in embodiment 1.

TABLE 3

| f1(mm) | 5.77 | f(mm) | 4.00 |
|---|---|---|---|
| f2(mm) | -194.20 | TTL(mm) | 5.05 |
| f3(mm) | 11.22 | ImgH(mm) | 3.44 |
| f4(mm) | -8.00 | | |
| f5(mm) | 18.40 | | |
| f6(mm) | 2.68 | | |
| f7(mm) | -2.22 | | |

As may be obtained from Table 3, the total effective focal length f of the camera lens assembly and the effective focal length f1 of the first lens E1 satisfy: f/f1=0.69; the total effective focal length f of the camera lens assembly and the effective focal length f5 of the fifth lens E5 satisfy: f/f5=0.22; the total effective focal length f of the camera lens assembly and the effective focal length f7 of the seventh lens E7 satisfy: f/f7=-1.80; the effective focal length f1 of the first lens E1 and the effective focal length f3 of the third lens E3 satisfy: f1/f3=0.51; the effective focal length f1 of the first lens E1 and the effective focal length f4 of the fourth lens E4 satisfy: f1/f4=-0.72; the effective focal length f6 of the sixth lens E6 and the effective focal length f7 of the seventh lens E7 satisfy: f6/f7=-1.21; and the distance TTL from the object-side surface S1 of the first lens E1 to the image plane S15 of the camera lens assembly on the optical axis and the half of the diagonal length ImgH of the effective pixel area on the image plane S15 of the camera lens assembly satisfy: TTL/ImgH=1.47.

In addition, in the present embodiment, the total effective focal length f of the camera lens assembly and the entrance pupil diameter EPD of the camera lens assembly satisfy: f/EPD=1.55.

Figures 2A, 2B:
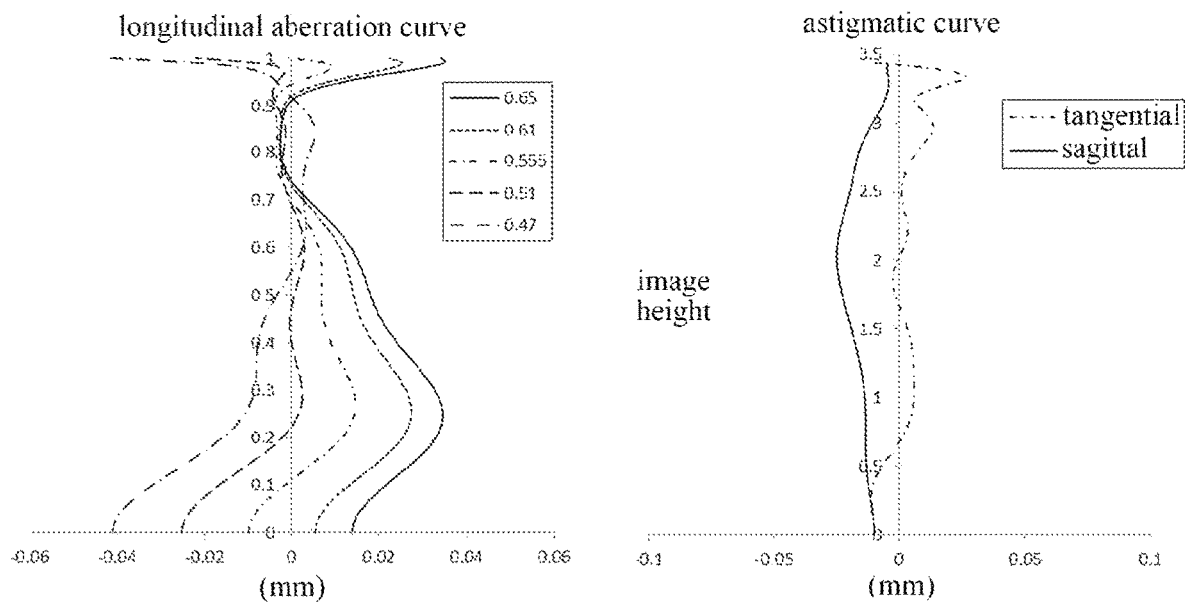
FIGS. 2A-2D respectively illustrate a longitudinal aberration curve, an astigmatic curve, a distortion curve and a lateral color curve of the camera lens assembly according to embodiment 1.
Figures 2C, 2D:
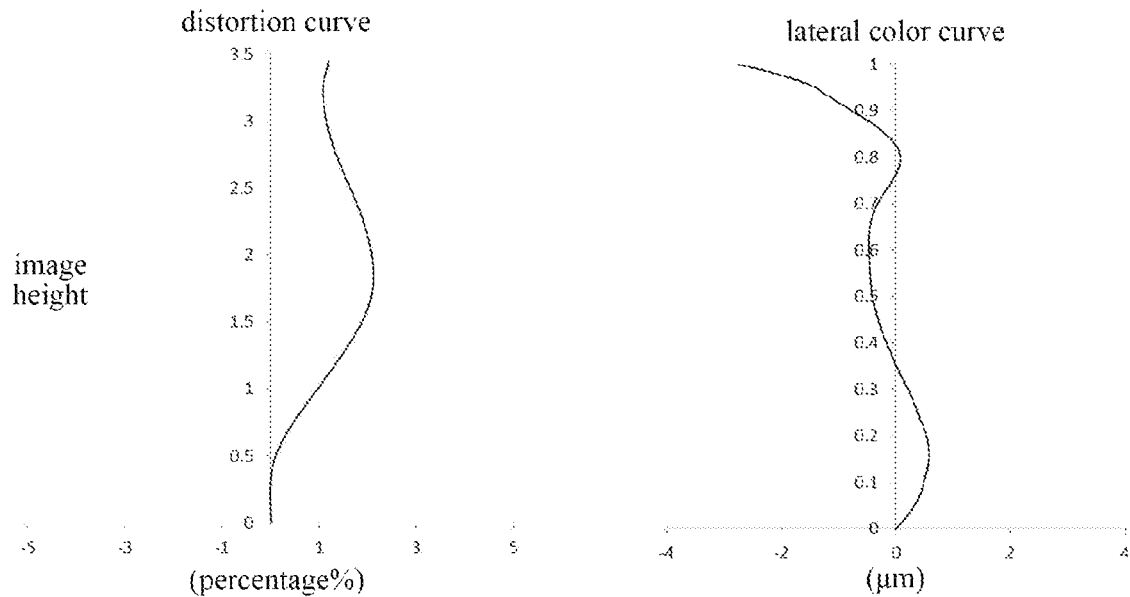

FIG. 2A shows a longitudinal aberration curve of the camera lens assembly according to embodiment 1, representing deviations of focal points of light of different wavelengths converged after passing through an optical system. FIG. 2B shows an astigmatic curve of the camera lens assembly according to embodiment 1, representing a curvature of a tangential image plane and a curvature of a sagittal image plane. FIG. 2C shows a distortion curve of the camera lens assembly according to embodiment 1, representing amounts of distortion at different viewing angles. FIG. 2D shows a lateral color curve of the camera lens assembly according to embodiment 1, representing deviations of different image heights on an image plane after light passes through the camera lens assembly. It can be seen from FIGS. 2A to 2D that the camera lens assembly according to embodiment 1 can achieve a good image quality.

Embodiment 2

Figure 3:
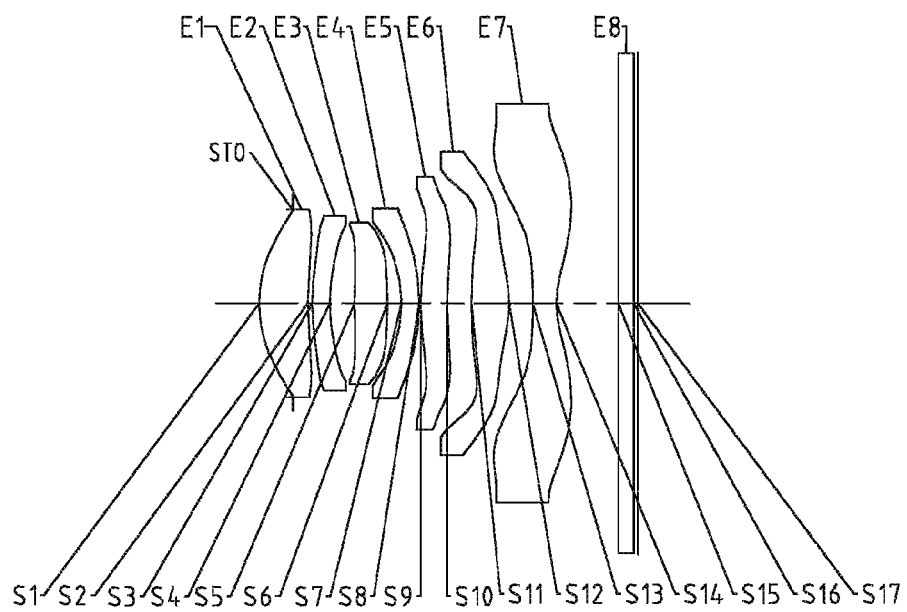
FIG. 3 is a schematic structural diagram illustrating a camera lens assembly according to embodiment 2 of the present disclosure.

A camera lens assembly according to embodiment 2 of the present disclosure is described below with reference to FIGS. 3 to 4D. In the present embodiment and the following embodiments, for the purpose of brevity, the description of parts similar to those in embodiment 1 will be omitted. FIG. 3 is a schematic structural diagram illustrating the camera lens assembly according to embodiment 2 of the present disclosure.

As shown in FIG. 3, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object passes through the surfaces S1 to S16 sequentially and is finally imaged on an image plane 517.

Table 4 shows the surface type, the radius of curvature, the thickness, the material and the conic coefficient of each lens of the camera lens assembly in embodiment 2. Table 5 shows the higher-order coefficients applicable to each aspheric mirror surface in embodiment 2. Table 6 shows the effective focal lengths f1-f7 of the lenses, the total effective focal length f of the camera lens assembly, the total track length TTL of the camera lens assembly and the half of the diagonal length ImgH of the effective pixel area on the image plane S17 in embodiment 2. Here, the aspheric surface types may be defined by the formula (1) given in the above embodiment 1.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4542 | | | |
| S1 | aspheric | 1.8425 | 0.6592 | 1.55 | 56.1 | 0.7020 |
| S2 | aspheric | 3.8868 | 0.0615 | | | −9.3631 |
| S3 | aspheric | 2.6652 | 0.2400 | 1.73 | 28.8 | −29.8045 |
| S4 | aspheric | 2.4973 | 0.3376 | | | 2.4824 |
| S5 | aspheric | 13.6954 | 0.4452 | 1.55 | 56.1 | 84.5937 |
| S6 | aspheric | −10.6887 | 0.1922 | | | 1.6538 |
| S7 | aspheric | −1.7970 | 0.2400 | 1.74 | 28.2 | 1.0657 |
| S8 | aspheric | −2.8549 | 0.0200 | | | 2.0521 |
| S9 | aspheric | 2.9269 | 0.3587 | 1.70 | 48.1 | 1.7826 |
| S10 | aspheric | 3.7705 | 0.3352 | | | 2.0694 |
| S11 | aspheric | 15.5356 | 0.5114 | 1.59 | 55.3 | −9.6073 |
| S12 | aspheric | −1.6482 | 0.3216 | | | −7.7528 |
| S13 | aspheric | −49.1743 | 0.3200 | 1.54 | 55.8 | 99.0000 |
| S14 | aspheric | 1.2172 | 0.8438 | | | −6.7763 |
| S15 | spherical | infinite | 0.2100 | 1.52 | 64.2 | |
| S16 | spherical | infinite | 0.0536 | | | |
| S17 | spherical | infinite | 0 | | | |

TABLE 5

| Surface number | A4 | A6 | A8 | A10 | A12 | A14 | A16 | A18 |
|---|---|---|---|---|---|---|---|---|
| S1 | −1.9098E−02 | 2.4496E−02 | −7.5638E−02 | 9.2931E−02 | −7.0500E−02 | 2.7660E−02 | −5.4164E−03 | 0 |
| S2 | −1.0938E−01 | 4.1319E−02 | 7.3160E−02 | −1.3944E−01 | 1.0001E−01 | −3.5512E−02 | 5.0726E−03 | 0 |
| S3 | 3.5919E−02 | −2.9450E−01 | 6.1164E−01 | −6.7966E−01 | 4.4764E−01 | −1.5826E−01 | 2.3811E−02 | 0 |
| S4 | −7.4012E−02 | −7.0898E−02 | 2.5417E−01 | −4.0903E−01 | 4.1704E−01 | −2.4472E−01 | 6.6129E−02 | 0 |
| S5 | −4.7586E−02 | 3.5993E−02 | −2.3525E−01 | 4.6104E−01 | −5.5206E−01 | 3.4829E−01 | −9.1523E−02 | 0 |
| S6 | −7.4567E−02 | −7.0245E−02 | 1.1458E−01 | −2.7722E−01 | 2.9055E−01 | −1.2886E−01 | 1.8686E−02 | 0 |
| S7 | 1.1963E−01 | −3.0632E−01 | 5.9791E−01 | −9.1525E−01 | 9.2176E−01 | −4.9155E−01 | 1.1072E−01 | 0 |
| S8 | 2.7976E−02 | −2.9331E−02 | 8.2704E−02 | −1.7885E−01 | 1.8732E−01 | −9.3159E−02 | 1.8586E−02 | 0 |
| S9 | −1.9925E−01 | 2.1327E−01 | −2.0825E−01 | 1.3637E−01 | −6.7285E−02 | 2.0025E−02 | −2.4331E−03 | 0 |
| S10 | −1.2107E−01 | 8.8515E−03 | 3.9450E−02 | −3.6730E−02 | 1.0316E−02 | −1.2342E−04 | −2.0794E−04 | 0 |
| S11 | 8.9983E−02 | −5.4797E−02 | −1.7392E−02 | 3.6200E−02 | −2.7230E−02 | 8.6006E−03 | −9.3293E−04 | 0 |
| S12 | 8.8409E−02 | 3.0816E−04 | −1.0087E−02 | −1.3105E−02 | 8.9417E−03 | −1.8854E−03 | 1.3462E−04 | 0 |
| S13 | −1.7347E−01 | 9.5842E−02 | −4.7799E−02 | 2.0456E−02 | −5.4921E−03 | 8.4579E−04 | −6.9049E−05 | 2.3259E−06 |
| S14 | −1.1733E−01 | 6.6758E−02 | −2.8858E−02 | 8.4404E−03 | −1.6035E−03 | 1.8731E−04 | −1.2006E−05 | 3.1876E−07 |

TABLE 6

| f1(mm) | 5.76 | f(mm) | 3.96 |
|---|---|---|---|
| f2(mm) | −136.64 | TTL(mm) | 5.15 |
| f3(mm) | 11.07 | ImgH(mm) | 3.40 |
| f4(mm) | −7.21 | | |
| f5(mm) | 15.91 | | |
| f6(mm) | 2.55 | | |
| f7(mm) | −2.21 | | |

Figure 4A:
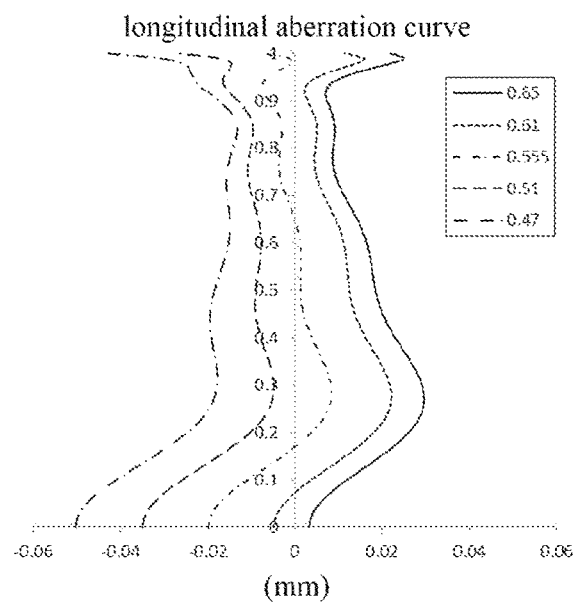
FIGS. 4A-4D respectively illustrate a longitudinal aberration curve, an astigmatic curve, a distortion curve and a lateral color curve of the camera lens assembly according to embodiment 2.
Figure 4B:
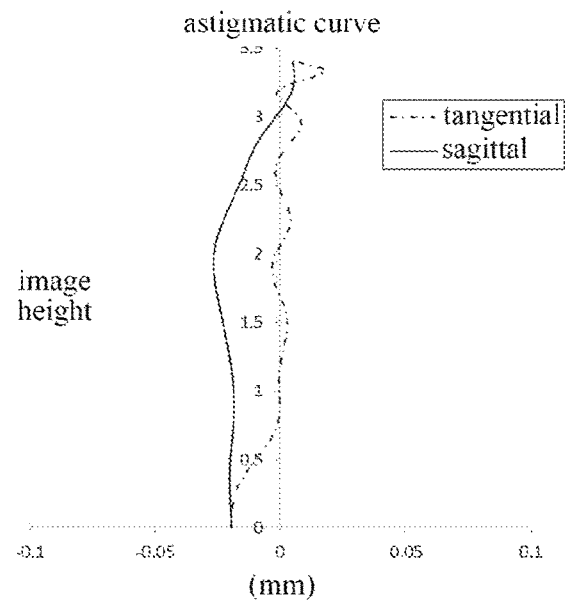
Figure 4C:
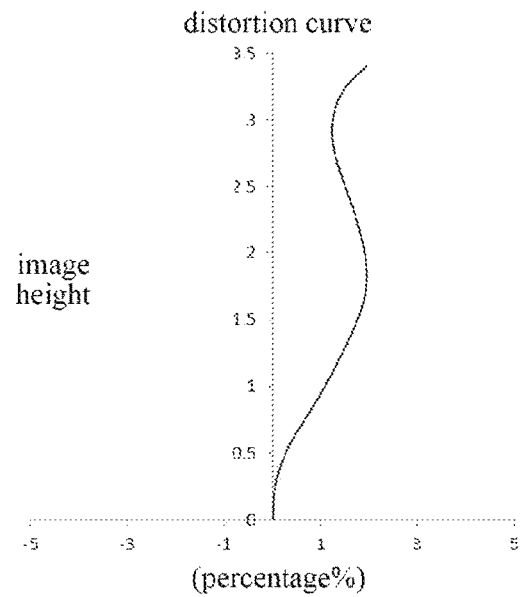
Figure 4D:
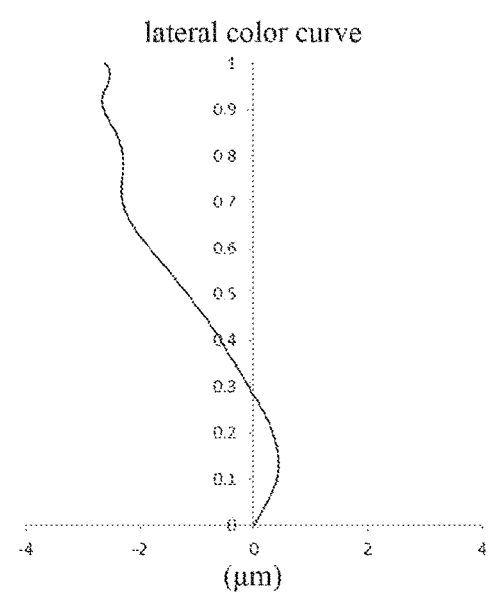

FIG. 4A shows a longitudinal aberration curve of the camera lens assembly according to embodiment 2, representing deviations of focal points of light of different wavelengths converged after passing through an optical system. FIG. 4B shows an astigmatic curve of the camera lens assembly according to embodiment 2, representing a curvature of a tangential image plane and a curvature of a sagittal image plane. FIG. 4C shows a distortion curve of the camera lens assembly according to embodiment 2, representing amounts of distortion at different viewing angles. FIG. 4D shows a lateral color curve of the camera lens assembly according to embodiment 2, representing deviations of different image heights on an image plane after light passes through the camera lens assembly. It can be seen from FIGS. 4A to 4D that the camera lens assembly according to embodiment 2 can achieve a good image quality.

Embodiment 3

Figure 5:
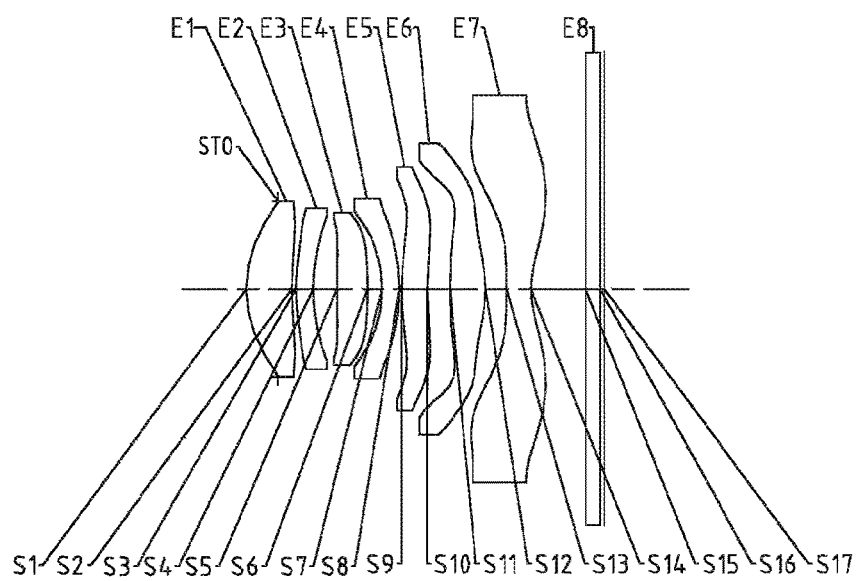
FIG. 5 is a schematic structural diagram illustrating a camera lens assembly according to embodiment 3 of the present disclosure.

A camera lens assembly according to embodiment 3 of the present disclosure is described below with reference to FIGS. 5 to 6D. FIG. 5 is a schematic structural diagram illustrating the camera lens assembly according to embodiment 3 of the present disclosure.

As shown in FIG. 5, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object passes through the surfaces S1 to S16 sequentially and is finally imaged on an image plane S17.

Table 7 shows the surface type, the radius of curvature, the thickness, the material and the conic coefficient of each lens of the camera lens assembly in embodiment 3. Table 8 shows the higher-order coefficients applicable to each aspheric mirror surface in embodiment 3. Table 9 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 3. Here, the aspheric surface types may be defined by the formula (1) given in the above embodiment 1.

TABLE 7

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4510 | | | |
| S1 | aspheric | 1.8442 | 0.6503 | 1.55 | 56.1 | 0.7042 |
| S2 | aspheric | 3.7201 | 0.0615 | | | −9.9307 |
| S3 | aspheric | 2.5969 | 0.2500 | 1.75 | 28.0 | −28.7497 |
| S4 | aspheric | 2.5240 | 0.3395 | | | 2.4996 |
| S5 | aspheric | 14.0085 | 0.4399 | 1.55 | 56.1 | 88.6854 |
| S6 | aspheric | −10.6820 | 0.2078 | | | −5.5342 |
| S7 | aspheric | −1.7982 | 0.2500 | 1.76 | 27.6 | 1.0658 |
| S8 | aspheric | −2.8526 | 0.0300 | | | 2.0062 |
| S9 | aspheric | 2.9620 | 0.3726 | 1.72 | 46.0 | 1.7837 |
| S10 | aspheric | 3.8305 | 0.3320 | | | 2.0974 |
| S11 | aspheric | 15.2232 | 0.5106 | 1.59 | 58.9 | −30.4237 |
| S12 | aspheric | −1.6806 | 0.3027 | | | −8.1272 |
| S13 | aspheric | −133.5399 | 0.3476 | 1.54 | 55.8 | 99.0000 |
| S14 | aspheric | 1.1934 | 0.7866 | | | −6.7572 |
| S15 | spherical | infinite | 0.2100 | 1.52 | 64.2 | |
| S16 | spherical | infinite | 0.0600 | | | |
| S17 | spherical | infinite | 0 | | | |

TABLE 8

| Surface number | A4 | A6 | A8 | A10 | A12 | A14 | A16 | A18 |
|---|---|---|---|---|---|---|---|---|
| S1 | −1.7623E−02 | 1.8009E−02 | −5.7952E−02 | 6.7672E−02 | −5.0504E−02 | 1.9677E−02 | −4.1854E−03 | 0 |
| S2 | −1.1933E−01 | 6.6108E−02 | 3.8538E−02 | −1.0680E−01 | 8.1049E−02 | −2.9779E−02 | 4.4199E−03 | 0 |
| S3 | 3.6187E−02 | −2.8748E−01 | 5.9414E−01 | −6.6102E−01 | 4.3582E−01 | −1.5445E−01 | 2.3359E−02 | 0 |
| S4 | −7.5562E−02 | −5.6376E−02 | 2.1198E−01 | −3.3878E−01 | 3.4266E−01 | −1.9901E−01 | 5.4114E−02 | 0 |
| S5 | −4.5818E−02 | 2.6956E−02 | −2.1019E−01 | 4.2990E−01 | −5.3343E−01 | 3.4583E−01 | −9.2427E−02 | 0 |
| S6 | −7.5511E−02 | −5.5891E−02 | 7.0163E−02 | −2.0271E−01 | 2.2038E−01 | −9.2845E−02 | 1.0641E−02 | 0 |
| S7 | 1.2126E−01 | −3.1526E−01 | 6.3011E−01 | −9.8173E−01 | 9.9087E−01 | −5.2445E−01 | 1.1614E−01 | 0 |
| S8 | 2.8190E−02 | −3.6283E−02 | 1.0001E−01 | −1.9355E−01 | 1.9053E−01 | −9.0831E−02 | 1.7509E−02 | 0 |
| S9 | −1.9623E−01 | 2.0525E−01 | −1.9789E−01 | 1.3238E−01 | −6.7511E−02 | 2.0539E−02 | −2.5392E−03 | 0 |
| S10 | −1.2179E−01 | 6.8942E−03 | 3.8296E−02 | −3.0984E−02 | 5.7298E−03 | 1.3514E−03 | −3.7997E−04 | 0 |
| S11 | 8.9011E−02 | −5.4580E−02 | −1.9670E−02 | 3.9891E−02 | −2.9454E−02 | 9.1829E−03 | −9.8868E−04 | 0 |
| S12 | 8.6380E−02 | 1.6721E−03 | −1.1490E−02 | −1.1601E−02 | 8.1805E−03 | −1.7162E−03 | 1.2075E−04 | 0 |
| S13 | −1.8056E−01 | 1.0156E−01 | −5.1661E−02 | 2.2536E−02 | −6.1666E−03 | 9.6722E−04 | −8.0352E−05 | 2.7512E−06 |
| S14 | −1.0782E−01 | 5.7877E−02 | −2.4334E−02 | 6.9631E−03 | −1.2864E−03 | 1.4585E−04 | −9.0943E−06 | 2.3562E−07 |

TABLE 9

| f1(mm) | 5.97 | f(mm) | 3.96 |
|---|---|---|---|
| f2(mm) | 254.99 | TTL(mm) | 5.15 |
| f3(mm) | 11.17 | ImgH(mm) | 3.40 |
| f4(mm) | −7.13 | | |
| f5(mm) | 15.29 | | |
| f6(mm) | 2.57 | | |
| f7(mm) | −2.20 | | |

Figures 6A, 6B:
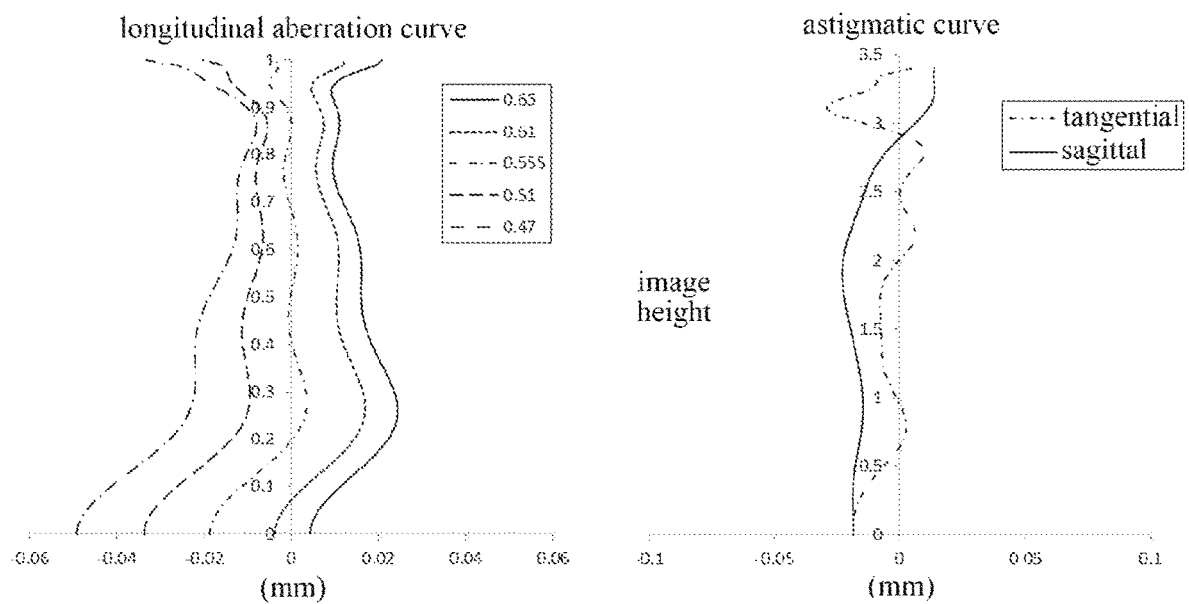

FIG. 6A shows a longitudinal aberration curve of the camera lens assembly according to embodiment 3, representing deviations of focal points of light of different wavelengths converged after passing through an optical system. FIG. 6B shows an astigmatic curve of the camera lens assembly according to embodiment 3, representing a curvature of a tangential image plane and a curvature of a sagittal image plane. FIG. 6C shows a distortion curve of the camera lens assembly according to embodiment 3, representing amounts of distortion at different viewing angles. FIG. 6D shows a lateral color curve of the camera lens assembly according to embodiment 3, representing deviations of different image heights on an image plane after light passes through the camera lens assembly. It can be seen from FIGS. 6A to 6D that the camera lens assembly according to embodiment 3 can achieve a good image quality.

Embodiment 4

A camera lens assembly according to embodiment 4 of the present disclosure is described below with reference to FIGS. 7 to 8D. FIG. 7 is a schematic structural diagram illustrating the camera lens assembly according to embodiment 4 of the present disclosure.

As shown in FIG. 7, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object sequentially passes through the surfaces S1 to S16 and is finally imaged on an image plane S17.

Table 10 shows the surface type, the radius of curvature, the thickness, the material and the conic coefficient of each lens of the camera lens assembly in embodiment 4. Table 11 shows the higher-order coefficients applicable to each aspheric mirror surface in embodiment 4. Table 12 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 4. Here, the aspheric surface types may be defined by the formula (1) given in the above embodiment 1.

TABLE 10

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4602 | | | |
| S1 | aspheric | 1.8757 | 0.6849 | 1.55 | 56.1 | 0.7390 |
| S2 | aspheric | 3.7292 | 0.0615 | | | −9.3304 |
| S3 | aspheric | 2.6342 | 0.2500 | 1.76 | 27.6 | −29.5452 |
| S4 | aspheric | 2.5428 | 0.3279 | | | 2.6209 |
| S5 | aspheric | 10.2124 | 0.4948 | 1.55 | 56.1 | 67.2900 |
| S6 | aspheric | −12.2830 | 0.2285 | | | −99.0000 |
| S7 | aspheric | −1.8040 | 0.2500 | 1.76 | 27.6 | 1.0614 |
| S8 | aspheric | −2.7661 | 0.0300 | | | 1.9537 |
| S9 | aspheric | 3.0756 | 0.4149 | 1.73 | 45.7 | 1.7873 |
| S10 | aspheric | 3.8672 | 0.2769 | | | 2.1430 |
| S11 | aspheric | 11.6969 | 0.4988 | 1.55 | 48.6 | −39.6879 |
| S12 | aspheric | −1.8989 | 0.3977 | | | −8.4641 |
| S13 | aspheric | 803.3138 | 0.3600 | 1.54 | 55.8 | −99.0000 |
| S14 | aspheric | 1.2718 | 0.6187 | | | −6.7163 |
| S15 | spherical | infinite | 0.2100 | 1.52 | 64.2 | |
| S16 | spherical | infinite | 0.0635 | | | |
| S17 | spherical | infinite | 0 | | | |

TABLE 11

| Surface number | A4 | A6 | A8 | A10 | A12 | A14 | A16 | A18 |
|---|---|---|---|---|---|---|---|---|
| S1 | −1.6653E−02 | 1.2344E−02 | −4.7591E−02 | 6.4487E−02 | −5.7270E−02 | 2.6488E−02 | −5.7287E−03 | 0 |
| S2 | −1.2924E−01 | 1.0399E−01 | −4.1256E−02 | −1.2338E−03 | 1.4129E−03 | 1.9494E−03 | −7.7376E−04 | 0 |
| S3 | 2.6799E−02 | −2.4570E−01 | 5.0960E−01 | −5.5020E−01 | 3.5117E−01 | −1.2260E−01 | 1.8523E−02 | 0 |
| S4 | −7.7138E−02 | −3.5169E−02 | 1.6586E−01 | −2.4627E−01 | 2.2937E−01 | −1.2339E−01 | 3.1176E−02 | 0 |
| S5 | −4.3478E−02 | 4.5043E−02 | −2.5802E−01 | 5.1734E−01 | −6.0079E−01 | 3.6626E−01 | −9.3349E−02 | 0 |
| S6 | −7.5547E−02 | 1.6037E−03 | −9.6445E−02 | 7.4503E−02 | −3.4274E−02 | 2.4583E−02 | −9.9282E−03 | 0 |
| S7 | 1.2567E−01 | −3.0919E−01 | 5.9651E−01 | −9.1202E−01 | 9.1014E−01 | −4.7544E−01 | 1.0328E−01 | 0 |
| S8 | 2.2825E−02 | −3.3515E−02 | 8.0118E−02 | −1.3279E−01 | 1.2532E−01 | −5.8466E−02 | 1.0998E−02 | 0 |
| S9 | −1.8247E−01 | 1.7948E−01 | −1.5453E−01 | 9.0631E−02 | −4.0382E−02 | 1.1028E−02 | −1.2636E−03 | 0 |
| S10 | −1.1277E−01 | 8.8118E−03 | 2.3758E−02 | −1.6076E−02 | 5.6811E−04 | 1.7365E−03 | −3.2185E−04 | 0 |
| S11 | 7.2195E−02 | −1.9998E−02 | −6.3941E−02 | 7.3837E−02 | −4.3582E−02 | 1.2143E−02 | −1.2344E−03 | 0 |
| S12 | 7.9259E−02 | 2.3852E−02 | −3.3175E−02 | 1.5382E−03 | 3.7902E−03 | −9.9115E−04 | 7.4359E−05 | 0 |
| S13 | −1.7021E−01 | 9.0451E−02 | −4.3979E−02 | 1.8448E−02 | −4.8518E−03 | 7.3078E−04 | −5.8312E−05 | 1.9187E−06 |
| S14 | −8.2052E−02 | 3.3304E−02 | −9.3056E−03 | 1.3726E−03 | −8.1470E−05 | −1.1356E−06 | 3.0811E−07 | −8.6766E−09 |

TABLE 12

| | | | |
|---|---|---|---|
| f1(mm) | 6.11 | f(mm) | 3.90 |
| f2(mm) | 532.41 | TTL(mm) | 5.17 |
| f3(mm) | 10.29 | ImgH(mm) | 3.40 |
| f4(mm) | −7.69 | | |
| f5(mm) | 16.71 | | |
| f6(mm) | 2.98 | | |
| f7(mm) | −2.37 | | |

Figure 8A:
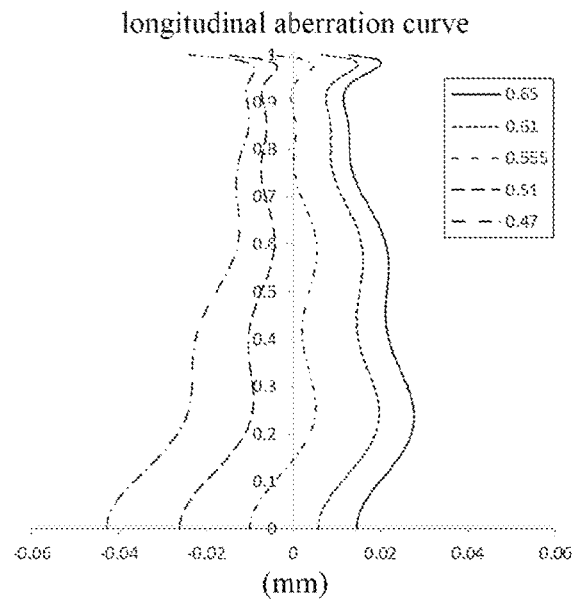
FIGS. 8A-8D respectively illustrate a longitudinal aberration curve, an astigmatic curve, a distortion curve and a lateral color curve of the camera lens assembly according to embodiment 4.
Figure 8B:
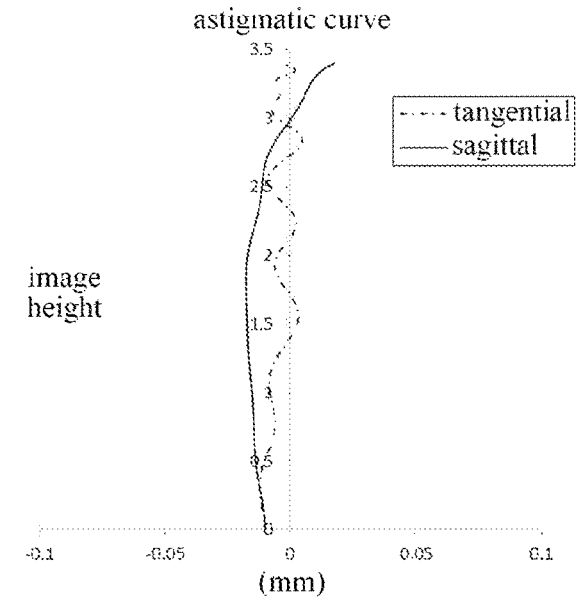
Figure 8C:
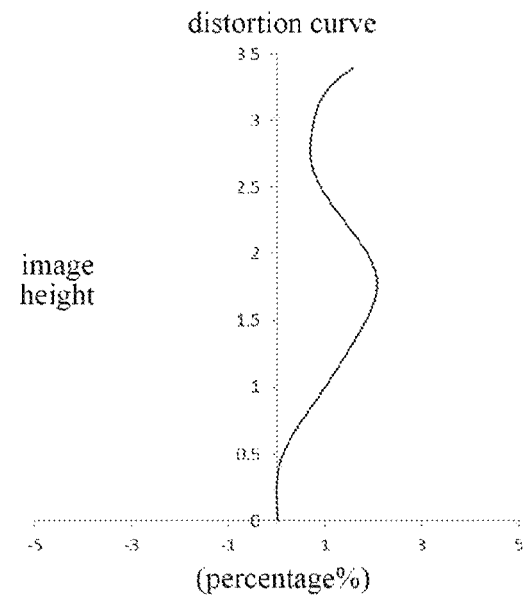
Figure 8D:
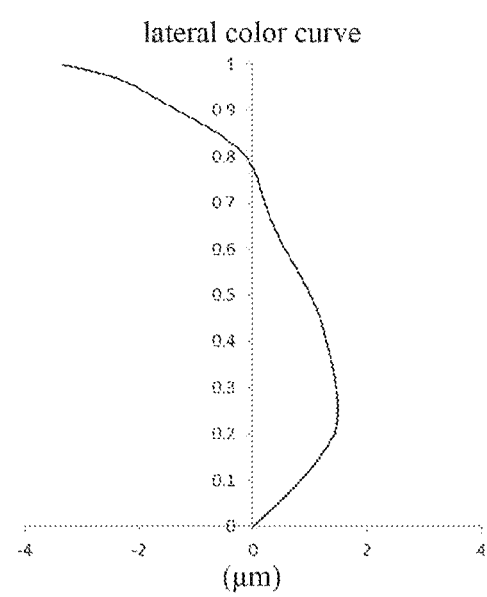

FIG. 8A shows a longitudinal aberration curve of the camera lens assembly according to embodiment 4, representing deviations of focal points of light of different wavelengths converged after passing through an optical system. FIG. 8B shows an astigmatic curve of the camera lens assembly according to embodiment 4, representing a curvature of a tangential image plane and a curvature of a sagittal image plane. FIG. 8C shows a distortion curve of the camera lens assembly according to embodiment 4, representing amounts of distortion at different viewing angles. FIG. 8D shows a lateral color curve of the camera lens assembly according to embodiment 4, representing deviations of different image heights on an image plane after light passes through the camera lens assembly. It can be seen from FIGS. 8A to 8D that the camera lens assembly according to embodiment 4 can achieve a good image quality.

Embodiment 5

A camera lens assembly according to embodiment 5 of the present disclosure is described below with reference to FIGS. 9 to 10D. FIG. 9 is a schematic structural diagram illustrating the camera lens assembly according to embodiment 5 of the present disclosure.

As shown in FIG. 9, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object sequentially passes through the surfaces S1 to S16 and is finally imaged on an image plane S17.

Table 13 shows the surface type, the radius of curvature, the thickness, the material and the conic coefficient of each lens of the camera lens assembly in embodiment 5. Table 14 shows the higher-order coefficients applicable to each aspheric mirror surface in embodiment 5. Table 15 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 5. Here, the aspheric surface types may be defined by the formula (1) given in the above embodiment 1.

TABLE 13

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4265 | | | |
| S1 | aspheric | 1.8813 | 0.5663 | 1.55 | 56.1 | 0.6485 |
| S2 | aspheric | 3.2783 | 0.0615 | | | −8.6051 |
| S3 | aspheric | 2.5790 | 0.2500 | 1.76 | 27.6 | −39.8311 |
| S4 | aspheric | 2.6492 | 0.2323 | | | 1.7755 |
| S5 | aspheric | 10.9286 | 0.3932 | 1.55 | 56.1 | 64.4479 |
| S6 | aspheric | −9.6709 | 0.2210 | | | −99.0000 |
| S7 | aspheric | −1.8642 | 0.2501 | 1.76 | 27.6 | 1.0644 |
| S8 | aspheric | −2.9848 | 0.0301 | | | 2.1154 |
| S9 | aspheric | 4.4880 | 0.4587 | 1.70 | 48.8 | 2.4920 |
| S10 | aspheric | 6.3902 | 0.3302 | | | −22.8905 |
| S11 | aspheric | 8.6334 | 0.4930 | 1.71 | 47.7 | −48.7085 |
| S12 | aspheric | −2.0747 | 0.2955 | | | −14.7983 |
| S13 | aspheric | 49.5891 | 0.3600 | 1.54 | 55.8 | −99.0000 |
| S14 | aspheric | 1.2077 | 0.7208 | | | −6.1422 |
| S15 | spherical | infinite | 0.2100 | 1.52 | 64.2 | |
| S16 | spherical | infinite | 0.1804 | | | |
| S17 | spherical | infinite | 0 | | | |

TABLE 14

| Surface number | A4 | A6 | A8 | A10 | A12 | A14 | A16 | A18 |
|---|---|---|---|---|---|---|---|---|
| S1 | −1.0652E−02 | 1.0198E−02 | −2.2334E−02 | 2.4659E−02 | −2.1939E−02 | 1.3058E−02 | −3.5516E−03 | 0 |
| S2 | −5.1029E−02 | −7.9011E−02 | 2.0779E−01 | −1.9663E−01 | 9.6705E−02 | −2.3912E−02 | 2.1931E−03 | 0 |
| S3 | 1.5315E−01 | −6.0325E−01 | 9.7368E−01 | −9.1901E−01 | 5.2907E−01 | −1.7130E−01 | 2.3833E−02 | 0 |
| S4 | −4.8367E−02 | −1.2887E−01 | 2.3981E−01 | −3.2145E−01 | 3.6477E−01 | −2.5262E−01 | 7.5342E−02 | 0 |

TABLE 14-continued

| Surface number | A4 | A6 | A8 | A10 | A12 | A14 | A16 | A18 |
|---|---|---|---|---|---|---|---|---|
| S5 | 6.2981E−03 | −2.7735E−01 | 8.6795E−01 | −1.8523E+00 | 2.2097E+00 | −1.3540E+00 | 3.3142E−01 | 0 |
| S6 | −6.7177E−02 | −1.0001E−01 | 2.2821E−01 | −6.2519E−01 | 9.3979E−01 | −6.7260E−01 | 1.8008E−01 | 0 |
| S7 | 1.4957E−01 | −5.6020E−01 | 1.4917E+00 | −2.8141E+00 | 3.3221E+00 | −2.1069E+00 | 5.4515E−01 | 0 |
| S8 | 5.3897E−02 | −1.1048E−01 | 2.4366E−01 | −3.5692E−01 | 3.1737E−01 | −1.5573E−01 | 3.2549E−02 | 0 |
| S9 | −1.9262E−01 | 2.6138E−01 | −2.8501E−01 | 1.9724E−01 | −8.8400E−02 | 2.1913E−02 | −2.1194E−03 | 0 |
| S10 | −1.4625E−01 | 7.3056E−02 | −4.7001E−02 | 2.8782E−02 | −1.5677E−02 | 5.2130E−03 | −6.7653E−04 | 0 |
| S11 | 7.7160E−02 | −7.3692E−02 | 3.8499E−02 | −1.4838E−02 | −2.3342E−04 | 1.2786E−03 | −1.7913E−04 | 0 |
| S12 | 5.6503E−02 | −6.7134E−03 | 7.7088E−03 | −1.6277E−02 | 7.4144E−03 | −1.3440E−03 | 8.7880E−05 | 0 |
| S13 | −1.8398E−01 | 2.1180E−02 | 5.1401E−02 | −4.5833E−02 | 2.0724E−02 | −5.2365E−03 | 6.9071E−04 | −3.7095E−05 |
| S14 | −1.1671E−01 | 5.4346E−02 | −1.7156E−02 | 3.2875E−03 | −3.7885E−04 | 2.5953E−05 | −9.7479E−07 | 1.5418E−08 |

TABLE 15

| f1(mm) | 7.07 | f(mm) | 3.65 |
|---|---|---|---|
| f2(mm) | 50.43 | TTL(mm) | 5.05 |
| f3(mm) | 9.46 | ImgH(mm) | 3.40 |
| f4(mm) | −7.23 | | |
| f5(mm) | 19.52 | | |
| f6(mm) | 2.41 | | |
| f7(mm) | −2.31 | | |

Figure 10C:
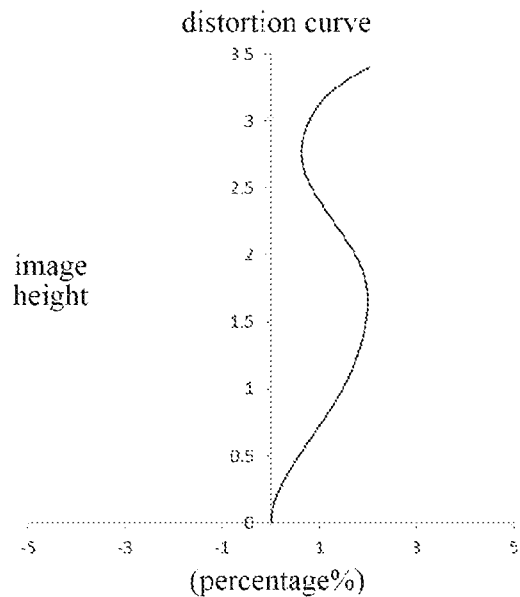
Figure 10D:
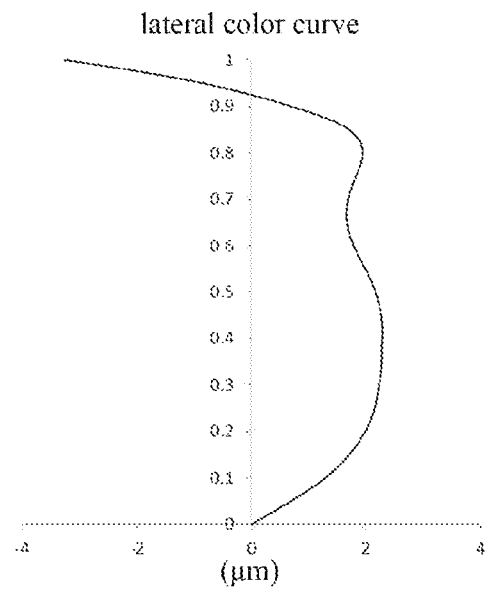

FIG. 10A shows a longitudinal aberration curve of the camera lens assembly according to embodiment 5, representing deviations of focal points of light of different wavelengths converged after passing through an optical system. FIG. 10B shows an astigmatic curve of the camera lens assembly according to embodiment 5, representing a curvature of a tangential image plane and a curvature of a sagittal image plane. FIG. 10C shows a distortion curve of the camera lens assembly according to embodiment 5, representing amounts of distortion at different viewing angles. FIG. 10D shows a lateral color curve of the camera lens assembly according to embodiment 5, representing deviations of different image heights on an image plane after light passes through the camera lens assembly. It can be seen from FIGS. 10A to 10D that the camera lens assembly according to embodiment 5 can achieve a good image quality.

Embodiment 6

Figure 11:
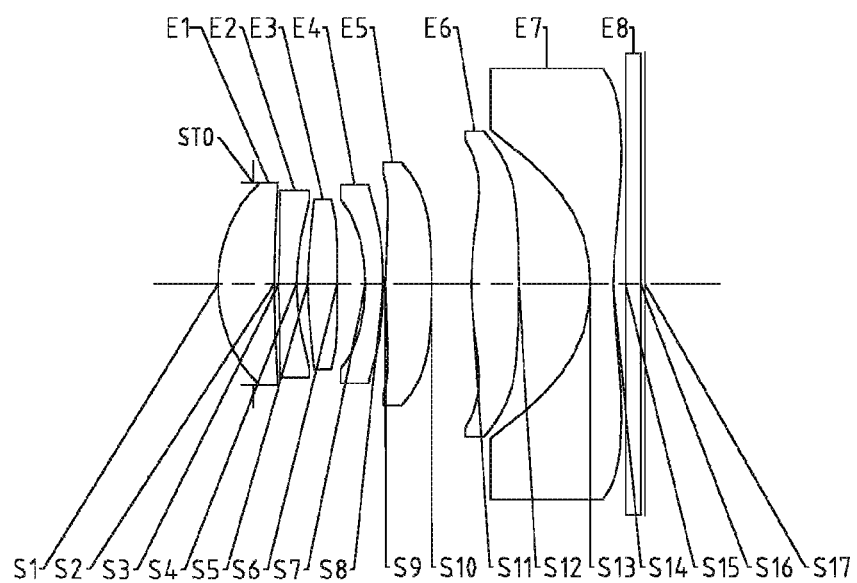
FIG. 11 is a schematic structural diagram illustrating a camera lens assembly according to embodiment 6 of the present disclosure.

A camera lens assembly according to embodiment 6 of the present disclosure is described below with reference to FIGS. 11 to 12D. FIG. 11 is a schematic structural diagram illustrating the camera lens assembly according to embodiment 6 of the present disclosure.

As shown in FIG. 11, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object sequentially passes through the surfaces S1 to S16 and is finally imaged on an image plane S17.

Table 16 shows the surface type, the radius of curvature, the thickness, the material and the conic coefficient of each lens of the camera lens assembly in embodiment 6. Table 17 shows the higher-order coefficients applicable to each aspheric mirror surface in embodiment 6. Table 18 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 6. Here, the aspheric surface types may be defined by the formula (1) given in the above embodiment 1.

TABLE 16

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4931 | | | |
| S1 | aspheric | 2.1336 | 0.7862 | 1.55 | 56.1 | 0.5337 |
| S2 | aspheric | 13.5648 | 0.0615 | | | 73.3449 |
| S3 | aspheric | 7.3119 | 0.2500 | 1.76 | 27.6 | −99.0000 |
| S4 | aspheric | 2.9809 | 0.1572 | | | −0.2525 |
| S5 | aspheric | 4.9045 | 0.4113 | 1.55 | 56.1 | −48.5706 |
| S6 | aspheric | 611.9044 | 0.3965 | | | 99.0000 |
| S7 | aspheric | −2.8482 | 0.2500 | 1.76 | 27.6 | 3.2367 |
| S8 | aspheric | −5.6053 | 0.0300 | | | 4.7108 |
| S9 | aspheric | 7.5756 | 0.6470 | 1.66 | 53.3 | −20.1098 |
| S10 | aspheric | −24.3824 | 0.5501 | | | −98.9711 |
| S11 | aspheric | 4.0924 | 0.6704 | 1.62 | 60.5 | −19.7948 |
| S12 | aspheric | −20.1350 | 0.9973 | | | 5.4616 |
| S13 | aspheric | −2.7146 | 0.3200 | 1.54 | 55.8 | −0.5398 |

TABLE 16-continued

| surface number | surface type | radius of curvature | thickness | material refractive index | abbe number | conic coefficient |
|---|---|---|---|---|---|---|
| S14 | aspheric | 4.0905 | 0.1761 | | | −28.5812 |
| S15 | spherical | infinite | 0.2100 | 1.52 | 64.2 | |
| S16 | spherical | infinite | 0.0600 | | | |
| S17 | spherical | infinite | 0 | | | |

TABLE 17

| Surface number | A4 | A6 | A8 | A10 | A12 | A14 | A16 | A18 |
|---|---|---|---|---|---|---|---|---|
| S1 | −2.1468E−03 | 2.4652E−03 | −5.0332E−03 | 4.6441E−03 | −2.2045E−03 | 4.7433E−04 | −3.6823E−05 | 0 |
| S2 | −2.6146E−02 | 1.6060E−02 | −3.5002E−03 | −6.5172E−03 | 7.3549E−03 | −3.4925E−03 | 6.7741E−04 | 0 |
| S3 | −3.9605E−02 | 4.6923E−03 | 2.1117E−02 | −2.1204E−02 | 9.8854E−03 | −2.1816E−03 | 1.8138E−04 | 0 |
| S4 | −5.0893E−02 | 1.3873E−02 | −5.1234E−03 | 1.7502E−02 | −2.4195E−02 | 1.4811E−02 | −3.4711E−03 | 0 |
| S5 | 4.6564E−02 | −5.9557E−02 | 2.8160E−02 | −5.9704E−03 | −6.9994E−03 | 5.6560E−03 | −1.1033E−03 | 0 |
| S6 | −2.0454E−02 | −1.5549E−02 | 7.7660E−03 | −1.7362E−02 | 1.7884E−02 | −9.3547E−03 | 2.1382E−03 | 0 |
| S7 | 1.1862E−02 | −6.4065E−02 | 5.4314E−02 | −1.7860E−02 | 2.6426E−03 | −1.6118E−04 | 2.2518E−06 | 0 |
| S8 | 1.1586E−02 | −5.9080E−02 | 5.4531E−02 | −2.1864E−02 | 4.3413E−03 | −3.7664E−04 | 7.2855E−06 | 0 |
| S9 | −3.1906E−02 | 1.0838E−02 | −1.0692E−02 | 7.6789E−03 | −3.9950E−03 | 1.1105E−03 | −1.2082E−04 | 0 |
| S10 | −6.4255E−02 | 2.9066E−02 | −1.8224E−02 | 6.9200E−03 | −1.5970E−03 | 1.5823E−04 | 5.9523E−07 | 0 |
| S11 | 1.1077E−03 | −1.4181E−02 | 5.5679E−03 | −2.2729E−03 | 6.0067E−04 | −7.8575E−05 | 3.9053E−06 | 0 |
| S12 | 5.2436E−03 | −1.0529E−02 | 1.9043E−03 | −3.7688E−04 | 8.0983E−05 | −8.5462E−06 | 3.1960E−07 | 0 |
| S13 | −7.9257E−02 | 3.1505E−02 | −8.2890E−03 | 1.3425E−03 | −1.1908E−04 | 5.7281E−06 | −1.4100E−07 | 1.3941E−09 |
| S14 | −1.9633E−02 | 4.0745E−03 | −4.3001E−04 | 1.7804E−05 | −3.8427E−07 | 4.5497E−09 | −2.7951E−11 | 6.9692E−14 |

TABLE 18

| f1(mm) | 4.53 | f(mm) | 4.38 |
|---|---|---|---|
| f2(mm) | −6.79 | TTL(mm) | 5.97 |
| f3(mm) | 9.05 | ImgH(mm) | 3.24 |
| f4(mm) | −7.93 | | |
| f5(mm) | 8.77 | | |
| f6(mm) | 5.56 | | |
| f7(mm) | −2.99 | | |

Figure 12A:
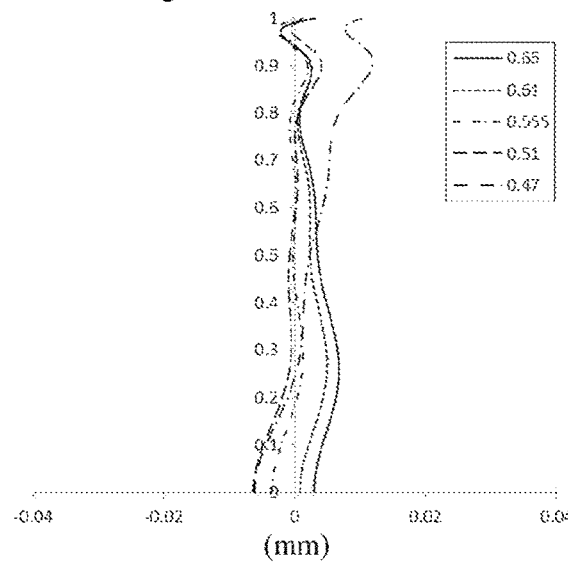
FIGS. 12A-12D respectively illustrate a longitudinal aberration curve, an astigmatic curve, a distortion curve and a lateral color curve of the camera lens assembly according to embodiment 6.
Figure 12B:
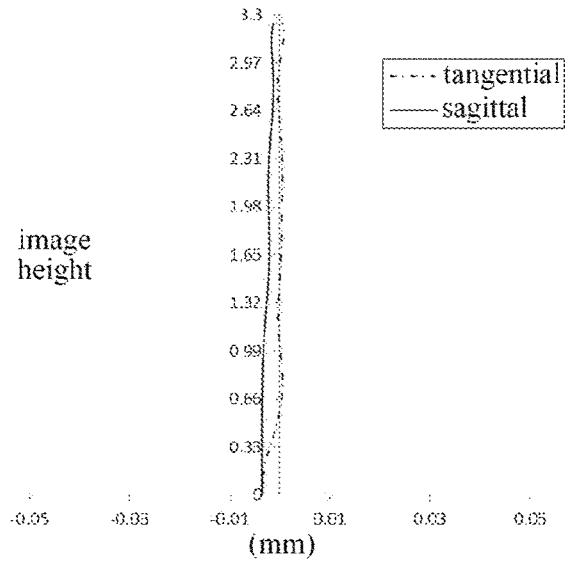
Figure 12C:
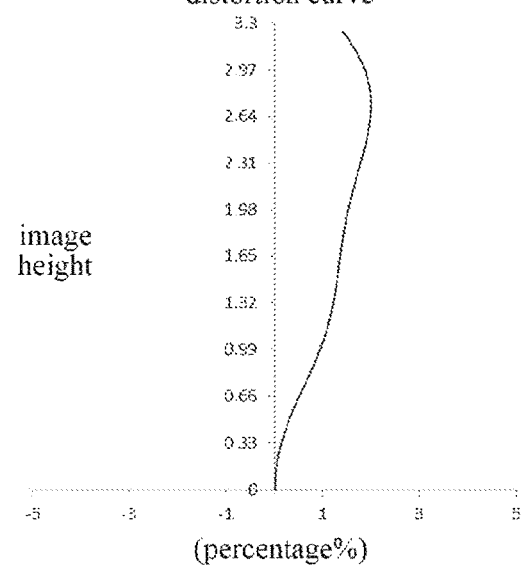
Figure 12D:
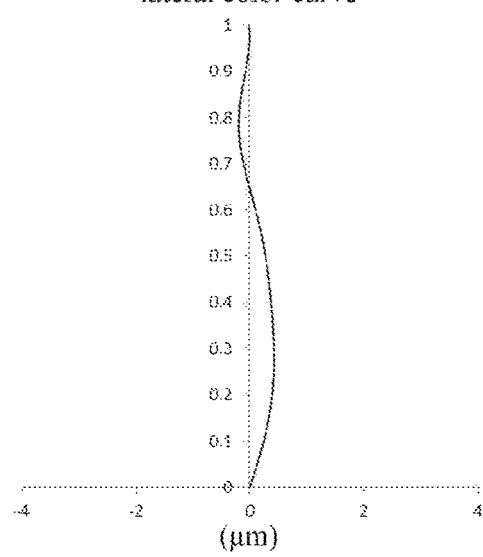

FIG. 12A shows a longitudinal aberration curve of the camera lens assembly according to embodiment 6, representing deviations of focal points of light of different wavelengths converged after passing through an optical system. FIG. 12B shows an astigmatic curve of the camera lens assembly according to embodiment 6, representing a curvature of a tangential image plane and a curvature of a sagittal image plane. FIG. 12C shows a distortion curve of the camera lens assembly according to embodiment 6, representing amounts of distortion at different viewing angles. FIG. 12D shows a lateral color curve of the camera lens assembly according to embodiment 6, representing deviations of different image heights on an image plane after light passes through the camera lens assembly. It can be seen from FIGS. 12A to 12D that the camera lens assembly according to embodiment 6 can achieve a good image quality.

Embodiment 7

A camera lens assembly according to embodiment 7 of the present disclosure is described below with reference to FIGS. 13 to 14D. FIG. 13 is a schematic structural diagram illustrating the camera lens assembly according to embodiment 7 of the present disclosure.

As shown in FIG. 13, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object sequentially passes through the surfaces S1 to S16 and is finally imaged on an image plane S17.

Table 19 shows the surface type, the radius of curvature, the thickness, the material and the conic coefficient of each lens of the camera lens assembly in embodiment 7. Table 20 shows the higher-order coefficients applicable to each aspheric mirror surface in embodiment 7. Table 21 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 7. Here, the aspheric surface types may be defined by the formula (1) given in the above embodiment 1.

TABLE 19

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.5210 | | | |
| S1 | aspheric | 2.1811 | 0.7528 | 1.55 | 56.1 | 0.8207 |
| S2 | aspheric | 16.6910 | 0.0615 | | | 29.2149 |
| S3 | aspheric | 7.5044 | 0.2500 | 1.76 | 27.6 | −95.3986 |
| S4 | aspheric | 3.0566 | 0.1548 | | | 1.3060 |
| S5 | aspheric | 5.1691 | 0.4189 | 1.55 | 56.1 | −42.8971 |
| S6 | aspheric | −80.8079 | 0.3550 | | | −99.0000 |
| S7 | aspheric | −2.6798 | 0.2500 | 1.76 | 27.6 | 2.7794 |
| S8 | aspheric | −5.5109 | 0.0300 | | | 1.8208 |
| S9 | aspheric | 7.5431 | 0.6563 | 1.69 | 49.5 | −64.0128 |
| S10 | aspheric | −17.9339 | 0.5525 | | | 98.9985 |
| S11 | aspheric | 4.4568 | 0.7502 | 1.53 | 66.0 | −12.3526 |
| S12 | aspheric | −6.9182 | 0.9590 | | | −7.1635 |
| S13 | aspheric | −1.9013 | 0.3200 | 1.54 | 55.8 | −0.5267 |
| S14 | aspheric | 6.0193 | 0.1762 | | | −34.2602 |
| S15 | spherical | infinite | 0.2100 | 1.52 | 64.2 | |
| S16 | spherical | infinite | 0.0603 | | | |
| S17 | spherical | infinite | 0 | | | |

TABLE 20

| Surface number | A4 | A6 | A8 | A10 | A12 | A14 | A16 | A18 |
|---|---|---|---|---|---|---|---|---|
| S1 | −6.2128E−03 | 2.3447E−03 | −1.0462E−02 | 1.2622E−02 | −9.8136E−03 | 4.0115E−03 | −7.6001E−04 | 0 |
| S2 | −1.5331E−02 | −1.2441E−02 | 3.7026E−02 | −3.9063E−02 | 2.2549E−02 | −7.3433E−03 | 1.0511E−03 | 0 |
| S3 | −2.6574E−02 | −3.0335E−02 | 6.7133E−02 | −5.4981E−02 | 2.4111E−02 | −5.3036E−03 | 4.5379E−04 | 0 |
| S4 | −4.4662E−02 | −1.3964E−02 | 2.9057E−02 | −1.3579E−02 | −5.7875E−03 | 8.3672E−03 | −2.5156E−03 | 0 |
| S5 | 3.4205E−02 | −4.0376E−02 | 2.0671E−03 | 2.0501E−02 | −2.3755E−02 | 1.2211E−02 | −2.2302E−03 | 0 |
| S6 | −2.6385E−02 | −1.4164E−02 | 1.7244E−02 | −3.5204E−02 | 3.4914E−02 | −1.6930E−02 | 3.3973E−03 | 0 |
| S7 | 3.7440E−02 | −5.5057E−02 | 4.4554E−02 | −1.7800E−02 | 3.5789E−03 | −3.5116E−04 | 1.3441E−05 | 0 |
| S8 | 1.1675E−02 | −6.4514E−03 | −5.1513E−03 | 1.4573E−02 | −1.0912E−02 | 3.6570E−03 | −4.5966E−04 | 0 |
| S9 | −4.6780E−02 | 4.3273E−02 | −4.8787E−02 | 3.3877E−02 | −1.5265E−02 | 3.8058E−03 | −3.8225E−04 | 0 |
| S10 | −5.9977E−02 | 1.6432E−02 | −6.1383E−03 | −4.0595E−04 | 1.1836E−03 | −4.6417E−04 | 6.0206E−05 | 0 |
| S11 | −1.4570E−02 | −4.7167E−03 | 1.6096E−03 | −8.8451E−04 | 2.8038E−04 | −3.8429E−05 | 1.8841E−06 | 0 |
| S12 | 7.0193E−03 | −9.6023E−03 | 1.4221E−03 | −9.2661E−05 | 3.0610E−06 | −5.0110E−08 | 3.2369E−10 | 0 |
| S13 | −1.4637E−02 | 3.6981E−03 | −1.6280E−04 | 3.4450E−06 | −4.0365E−08 | 2.6770E−10 | −9.4225E−13 | 1.3719E−15 |
| S14 | −1.1989E−02 | 2.3946E−03 | −2.7315E−04 | 1.3150E−05 | −3.4167E−07 | 4.8560E−09 | −3.5317E−11 | 1.0285E−13 |

TABLE 21

| f1(mm) | 4.51 | f(mm) | 4.35 |
|---|---|---|---|
| f2(mm) | −6.95 | TTL(mm) | 5.96 |
| f3(mm) | 8.91 | ImgH(mm) | 3.24 |
| f4(mm) | −7.13 | | |
| f5(mm) | 7.71 | | |
| f6(mm) | 5.18 | | |
| f7(mm) | −2.66 | | |

Figures 14C, 14D:
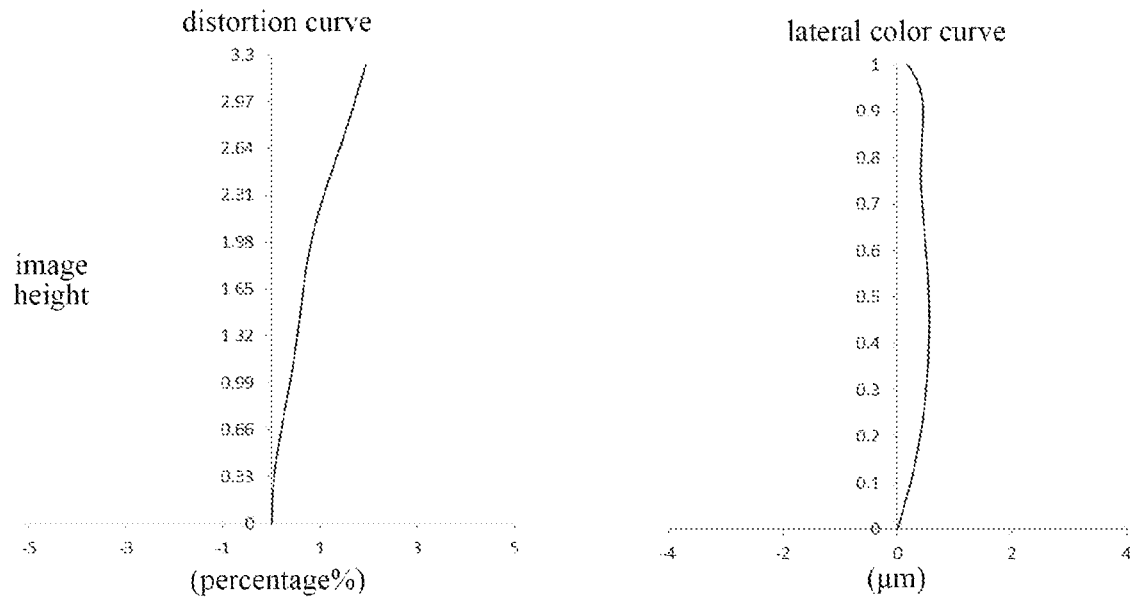

FIG. 14A shows a longitudinal aberration curve of the camera lens assembly according to embodiment 7, representing deviations of focal points of light of different wavelengths converged after passing through an optical system. FIG. 14B shows an astigmatic curve of the camera lens assembly according to embodiment 7, representing a curvature of a tangential image plane and a curvature of a sagittal image plane. FIG. 14C shows a distortion curve of the camera lens assembly according to embodiment 7, representing amounts of distortion at different viewing angles. FIG. 14D shows a lateral color curve of the camera lens assembly according to embodiment 7, representing deviations of different image heights on an image plane after light passes through the camera lens assembly. It can be seen from FIGS. 14A to 14D that the camera lens assembly according to embodiment 7 can achieve a good image quality.

Embodiment 8

Figure 15:
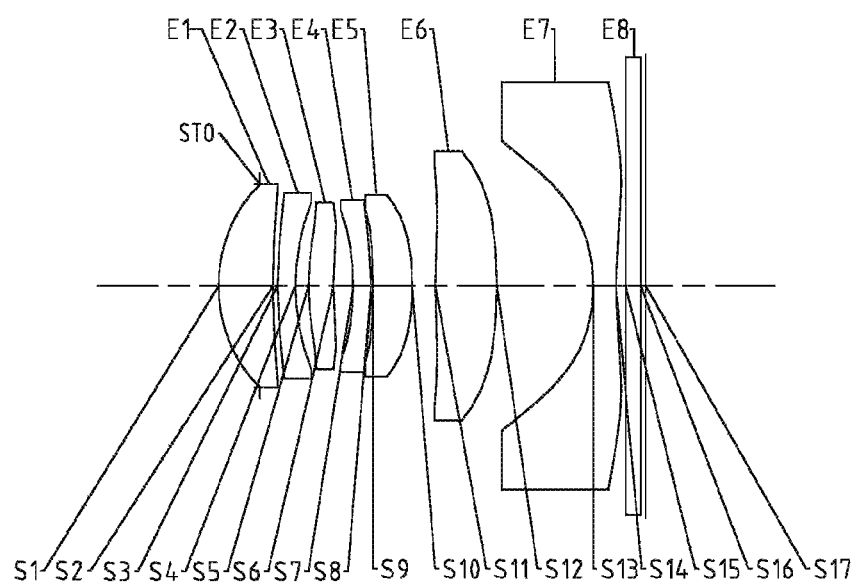
FIG. 15 is a schematic structural diagram illustrating a camera lens assembly according to embodiment 8 of the present disclosure.

A camera lens assembly according to embodiment 8 of the present disclosure is described below with reference to FIGS. 15 to 16D. FIG. 15 is a schematic structural diagram illustrating the camera lens assembly according to embodiment 8 of the present disclosure.

As shown in FIG. 15, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object sequentially passes through the surfaces S1 to S16 and is finally imaged on an image plane S17.

Table 22 shows the surface type, the radius of curvature, the thickness, the material and the conic coefficient of each lens of the camera lens assembly in embodiment 8. Table 23 shows the higher-order coefficients applicable to each aspheric mirror surface in embodiment 8. Table 24 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 8. Here, the aspheric surface types may be defined by the formula (1) given in the above embodiment 1.

TABLE 24-continued

| | |
|---|---|
| f6(mm) | 7.37 |
| f7(mm) | −3.38 |

Figure 16A:
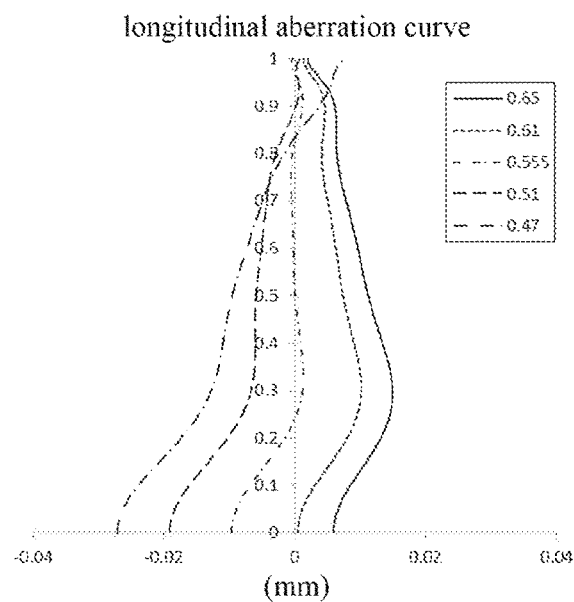
FIGS. 16A-16D respectively illustrate a longitudinal aberration curve, an astigmatic curve, a distortion curve and a lateral color curve of the camera lens assembly according to embodiment 8.
Figure 16B:
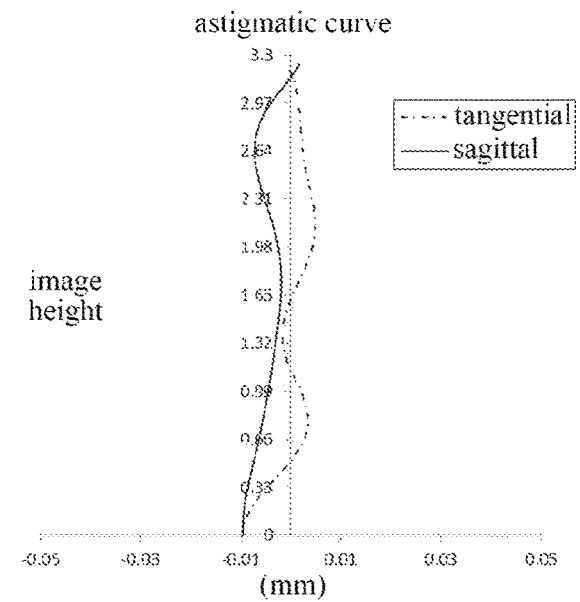
Figure 16C:
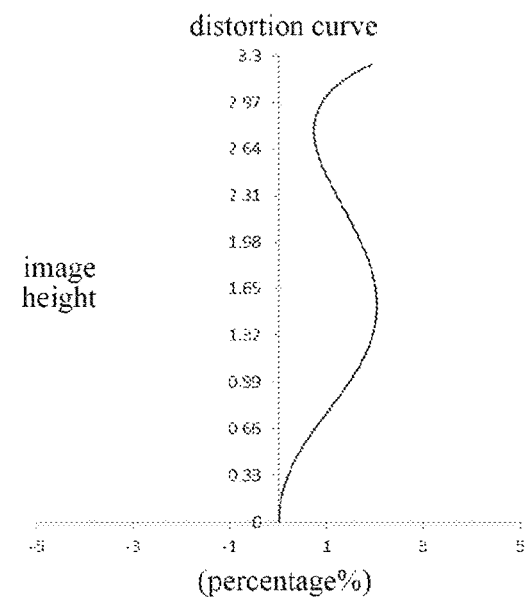
Figure 16D:
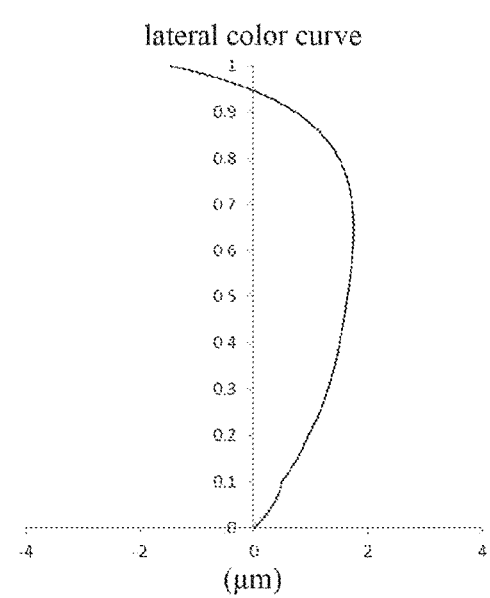

FIG. 16A shows a longitudinal aberration curve of the camera lens assembly according to embodiment 8, representing deviations of focal points of light of different wavelengths converged after passing through an optical system. FIG. 16B shows an astigmatic curve of the camera lens assembly according to embodiment 8, representing a curvature of a tangential image plane and a curvature of a sagittal image plane. FIG. 16C shows a distortion curve of the camera lens assembly according to embodiment 8, representing amounts of distortion at different viewing angles. FIG. 16D shows a lateral color curve of the camera lens assembly according to embodiment 8, representing deviations of different image heights on an image plane after light passes through the camera lens assembly. It can be seen from FIGS. 16A to 16D that the camera lens assembly according to embodiment 8 can achieve a good image quality.

TABLE 22

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.5742 | | | |
| S1 | aspheric | 2.1235 | 0.7608 | 1.55 | 56.1 | 0.4380 |
| S2 | aspheric | 10.3152 | 0.0615 | | | 27.1819 |
| S3 | aspheric | 5.4603 | 0.2500 | 1.76 | 27.6 | −50.6780 |
| S4 | aspheric | 2.7768 | 0.1839 | | | 1.5426 |
| S5 | aspheric | 3.2826 | 0.3497 | 1.55 | 56.1 | −31.6344 |
| S6 | aspheric | 5.5073 | 0.2764 | | | −99.0000 |
| S7 | aspheric | −3.3353 | 0.2500 | 1.76 | 27.6 | 3.0132 |
| S8 | aspheric | −3.9150 | 0.0300 | | | −48.4090 |
| S9 | aspheric | −7.7416 | 0.5473 | 1.62 | 60.3 | −69.2180 |
| S10 | aspheric | −4.2442 | 0.3226 | | | 1.3595 |
| S11 | aspheric | 7.7930 | 0.8598 | 1.53 | 57.2 | −99.0000 |
| S12 | aspheric | −7.5612 | 1.3458 | | | 10.7340 |
| S13 | aspheric | −2.8332 | 0.3200 | 1.54 | 55.8 | −1.1549 |
| S14 | aspheric | 5.2530 | 0.1348 | | | −55.0534 |
| S15 | spherical | infinite | 0.2100 | 1.52 | 64.2 | |
| S16 | spherical | infinite | 0.0717 | | | |
| S17 | spherical | infinite | 0 | | | |

TABLE 23

| Surface number | A4 | A6 | A8 | A10 | A12 | A14 | A16 | A18 |
|---|---|---|---|---|---|---|---|---|
| S1 | −2.3126E−03 | −5.1977E−04 | 4.3916E−05 | −1.6063E−06 | 3.0843E−08 | −3.0568E−10 | 1.2444E−12 | 0 |
| S2 | −2.9031E−02 | 2.4554E−02 | −2.0567E−02 | 1.3827E−02 | −5.9193E−03 | 1.3043E−03 | −1.0597E−04 | 0 |
| S3 | −1.2756E−02 | 9.3623E−03 | −2.5330E−03 | 3.2303E−04 | −2.1635E−05 | 7.3989E−07 | −1.0221E−08 | 0 |
| S4 | −5.2081E−02 | 2.7747E−02 | −1.4778E−02 | 8.0879E−03 | −6.6750E−03 | 3.7078E−03 | −6.8269E−04 | 0 |
| S5 | 5.5959E−02 | −1.1320E−01 | 9.4940E−02 | −4.4116E−02 | −6.1996E−03 | 1.4619E−02 | −3.6777E−03 | 0 |
| S6 | 2.2592E−02 | −9.4658E−02 | 5.5262E−02 | 3.3757E−03 | −4.9332E−02 | 4.0525E−02 | −1.0046E−02 | 0 |
| S7 | 3.0749E−02 | −2.1834E−02 | −1.1127E−02 | 4.6129E−02 | −5.5149E−02 | 3.3655E−02 | −7.9882E−03 | 0 |
| S8 | 5.4824E−03 | −1.0371E−04 | 1.2910E−06 | −6.3935E−09 | −6.7405E−12 | 1.3836E−13 | −1.1945E−15 | 0 |
| S9 | 1.0127E−02 | −1.0063E−01 | 1.1516E−01 | −1.0156E−01 | 5.1906E−02 | −1.4893E−02 | 1.8606E−03 | 0 |
| S10 | −7.5270E−02 | 2.2593E−02 | −5.7682E−03 | −5.9142E−03 | 5.3822E−03 | −1.9409E−03 | 2.6487E−04 | 0 |
| S11 | −2.7485E−02 | 2.1681E−03 | 3.1594E−03 | −1.1732E−03 | 1.5526E−04 | −1.0208E−05 | 2.9010E−07 | 0 |
| S12 | −8.9273E−03 | −4.5286E−03 | 4.7712E−04 | 4.2731E−04 | −1.3697E−04 | 1.5164E−05 | −5.7492E−07 | 0 |
| S13 | −9.1032E−02 | 2.6719E−02 | −5.9188E−03 | 1.0543E−03 | −1.1403E−04 | 6.6929E−06 | −1.9735E−07 | 2.2965E−09 |
| S14 | −1.1737E−02 | 2.9206E−04 | 7.0646E−05 | −3.2485E−06 | 6.2545E−08 | −6.2197E−10 | 3.1446E−12 | −6.4096E−15 |

TABLE 24

| | |
|---|---|
| f1(mm) | 4.74 |
| f2(mm) | −7.74 |
| f3(mm) | 14.10 |
| f4(mm) | −36.41 |
| f5(mm) | 14.24 |
| f(mm) | 4.41 |
| TTL(mm) | 5.97 |
| ImgH(mm) | 3.24 |

Embodiment 9

Figure 18C:
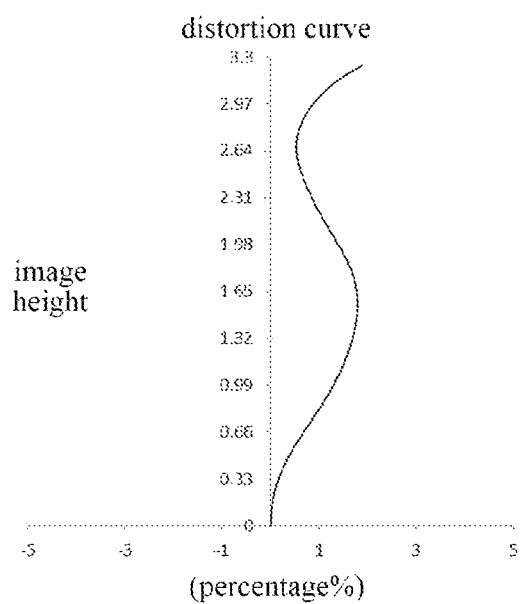
Figure 18D:
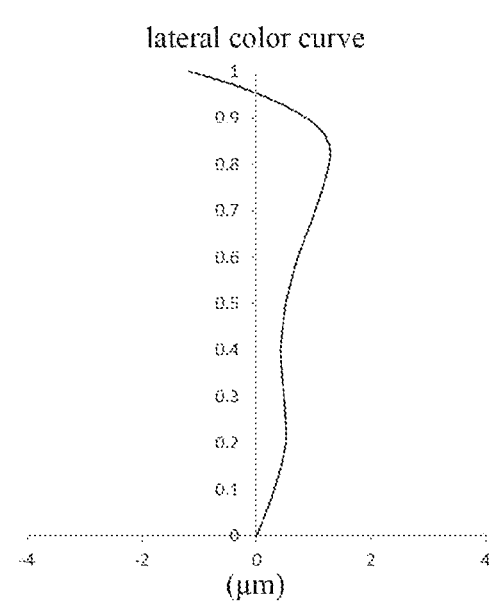

A camera lens assembly according to embodiment 9 of the present disclosure is described below with reference to FIGS. 17 to 18D. FIG. 17 is a schematic structural diagram illustrating the camera lens assembly according to embodiment 9 of the present disclosure.

As shown in FIG. 17, the camera lens assembly along an optical axis includes seven lenses E1-E7 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; the fifth lens E5 has an object-side surface S9 and an image-side surface S10; the sixth lens E6 has an object-side surface S11 and an image-side surface S12; and the seventh lens E7 has an object-side surface S13 and an image-side surface S14. Alternatively, the camera lens assembly may further include an optical filter E8 having an object-side surface S15 and an image-side surface S16. In the camera lens assembly of the present embodiment, an aperture STO may also be provided to limit light beams in order to improve the image quality of the camera lens assembly. Light from an object sequentially passes through the surfaces S1 to S16 and is finally imaged on an image plane S17.

Table 25 shows the surface type, the radius of curvature, the thickness, the material and the conic coefficient of each lens of the camera lens assembly in embodiment 9. Table 26 shows the higher-order coefficients applicable to each aspheric mirror surface in embodiment 9. Table 27 shows the effective focal lengths f1 to f7 of the lenses, the total effective focal length f of the camera lens assembly, the total track length TTL of the camera lens assembly and the half of the diagonal length ImgH of the effective pixel area on the image plane S17 in embodiment 9. Here, the aspheric surface types may be defined by the formula (1) given in the above embodiment 1.

TABLE 25

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4442 | | | |
| S1 | aspheric | 1.9030 | 0.7021 | 1.55 | 56.1 | 0.7927 |
| S2 | aspheric | 4.8204 | 0.0615 | | | −3.0059 |
| S3 | aspheric | 3.2546 | 0.2500 | 1.76 | 27.6 | −45.5264 |
| S4 | aspheric | 2.5272 | 0.2912 | | | 2.4488 |
| S5 | aspheric | 10.1415 | 0.5496 | 1.55 | 56.1 | 71.7192 |
| S6 | aspheric | −9.5543 | 0.2149 | | | −67.8548 |
| S7 | aspheric | −1.8210 | 0.2500 | 1.76 | 27.6 | 1.0357 |
| S8 | aspheric | −2.8309 | 0.0368 | | | 1.9668 |
| S9 | aspheric | 3.3635 | 0.4725 | 1.74 | 44.9 | 2.1669 |
| S10 | aspheric | 4.6248 | 0.2984 | | | 2.8294 |
| S11 | aspheric | 6.2999 | 0.5712 | 1.59 | 62.3 | −54.3027 |
| S12 | aspheric | −2.4170 | 0.4392 | | | −13.3253 |
| S13 | aspheric | −16.3701 | 0.3600 | 1.54 | 55.8 | 6.4903 |
| S14 | aspheric | 1.4383 | 0.6232 | | | −6.7932 |
| S15 | spherical | infinite | 0.2100 | 1.52 | 64.2 | |
| S16 | spherical | infinite | 0.0753 | | | |
| S17 | spherical | infinite | 0 | | | |

TABLE 26

| Surface number | A4 | A6 | A8 | A10 | A12 | A14 | A16 | A18 |
|---|---|---|---|---|---|---|---|---|
| S1 | −1.5025E−02 | 2.8315E−02 | −9.7482E−02 | 1.5063E−01 | −1.3397E−01 | 6.2078E−02 | −1.2237E−02 | 0 |
| S2 | −8.2352E−02 | −3.3533E−02 | 2.2928E−01 | −3.3732E−01 | 2.5770E−01 | −1.0499E−01 | 1.7721E−02 | 0 |
| S3 | 3.8510E−02 | −3.2740E−01 | 7.1402E−01 | −8.5837E−01 | 6.2393E−01 | −2.5461E−01 | 4.4861E−02 | 0 |
| S4 | −6.5506E−02 | −7.1648E−02 | 2.2714E−01 | −3.0010E−01 | 2.3908E−01 | −1.0479E−01 | 1.9774E−02 | 0 |
| S5 | −2.9320E−02 | 4.7383E−02 | −3.2735E−01 | 7.4385E−01 | −9.4121E−01 | 6.2140E−01 | −1.7081E−01 | 0 |
| S6 | −6.5453E−02 | −5.7569E−02 | 4.4032E−02 | −1.4677E−01 | 1.9360E−01 | −1.0214E−01 | 1.7862E−02 | 0 |
| S7 | 1.2357E−01 | −3.2777E−01 | 6.0275E−01 | −8.6993E−01 | 8.4053E−01 | −4.3553E−01 | 9.4546E−02 | 0 |
| S8 | 2.1733E−02 | −1.6776E−02 | 3.8114E−02 | −4.9308E−02 | 3.6876E−02 | −1.4978E−02 | 2.8399E−03 | 0 |
| S9 | −1.7520E−01 | 1.9799E−01 | −1.9505E−01 | 1.3399E−01 | −6.3933E−02 | 1.7450E−02 | −1.9531E−03 | 0 |
| S10 | −1.2295E−01 | 5.0415E−02 | −3.7178E−02 | 3.1372E−02 | −1.8655E−02 | 5.5553E−03 | −6.1295E−04 | 0 |
| S11 | 5.8603E−02 | −1.6145E−02 | −3.2633E−02 | 3.3241E−02 | −1.7900E−02 | 4.5432E−03 | −4.1641E−04 | 0 |
| S12 | 4.1746E−02 | 3.8582E−02 | −3.5549E−02 | 7.0528E−03 | 3.0020E−04 | −2.1930E−04 | 1.6890E−05 | 0 |
| S13 | −1.8793E−01 | 9.9813E−02 | −4.8346E−02 | 2.0399E−02 | −5.2398E−03 | 7.3391E−04 | −5.0346E−05 | 1.2132E−06 |
| S14 | −9.2473E−02 | 4.2748E−02 | −1.4479E−02 | 3.1889E−03 | −4.3293E−04 | 3.5500E−05 | −1.6260E−06 | 3.1866E−08 |

TABLE 27

| | | | |
|---|---|---|---|
| f1(mm) | 5.31 | f(mm) | 3.98 |
| f2(mm) | −17.47 | TTL(mm) | 5.41 |
| f3(mm) | 9.10 | ImgH(mm) | 3.24 |
| f4(mm) | −7.52 | | |
| f5(mm) | 14.23 | | |
| f6(mm) | 3.05 | | |
| f7(mm) | −2.45 | | |

To sum up, embodiment 1 to embodiment 9 respectively satisfy the relationships shown in Table 28 below.

TABLE 28

| Conditional formula | Embodiment | | | | | | | | |
|---|---|---|---|---|---|---|---|---|---|
| | 1 | 2 | 3 | 4 | 5 | 6 | 7 | 8 | 9 |
| f/EPD | 1.55 | 1.55 | 1.55 | 1.53 | 1.55 | 1.55 | 1.55 | 1.55 | 1.55 |
| f/f1 | 0.69 | 0.69 | 0.66 | 0.64 | 0.52 | 0.97 | 0.96 | 0.93 | 0.75 |
| f/f5 | 0.22 | 0.25 | 0.26 | 0.23 | 0.19 | 0.50 | 0.56 | 0.31 | 0.28 |
| f/f7 | −1.80 | −1.79 | −1.78 | −1.64 | −1.58 | −1.46 | −1.64 | −1.30 | −1.63 |
| f1/f3 | 0.51 | 0.52 | 0.53 | 0.59 | 0.75 | 0.50 | 0.51 | 0.34 | 0.58 |
| f1/f4 | −0.72 | −0.80 | −0.84 | −0.80 | −0.98 | −0.57 | −0.63 | −0.13 | −0.71 |
| f6/f7 | −1.21 | −1.15 | −1.17 | −1.25 | −1.04 | −1.86 | −1.95 | −2.18 | −1.25 |
| CT5/CT6 | 0.69 | 0.70 | 0.73 | 0.83 | 0.93 | 0.97 | 0.87 | 0.64 | 0.83 |
| T23/CT3 | 0.73 | 0.76 | 0.77 | 0.66 | 0.59 | 0.38 | 0.37 | 0.53 | 0.53 |
| R3/R8 | −0.92 | −0.93 | −0.91 | −0.95 | −0.86 | −1.30 | −1.36 | −1.39 | −1.15 |
| R4/R7 | −1.38 | −1.39 | −1.40 | −1.41 | −1.42 | −1.05 | −1.14 | −0.83 | −1.39 |
| \|(R7−R8)/(R7+R8)\| | 0.23 | 0.23 | 0.23 | 0.21 | 0.23 | 0.33 | 0.35 | 0.08 | 0.22 |
| TTL/ImgH | 1.47 | 1.51 | 1.52 | 1.52 | 1.49 | 1.84 | 1.84 | 1.85 | 1.67 |

The present disclosure further provides a camera device, having a photosensitive element which may be a photosensitive charge-coupled device (CCD) or complementary metal-oxide semiconductor (CMOS) element. The camera device may be an independent camera device, such as a digital camera, or may be a camera module integrated in a mobile electronic device such as a mobile phone. The camera device is equipped with the camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. A camera lens assembly, having a total effective focal length f and an entrance pupil diameter EPD, the camera lens assembly comprising sequentially, along an optical axis from an object side to an image side, a first lens, a second lens, a third lens, a fourth lens, a fifth lens, a sixth lens and a seventh lens,
    wherein each of the first lens and the sixth lens has a positive refractive power;
    each of the second lens, the third lens, the fifth lens and the seventh lens has a positive refractive power or a negative refractive power;
    the fourth lens has a negative refractive power, an object-side surface of the fourth lens is a concave surface, and an image-side surface of the fourth lens is a convex surface; and
    an object-side surface of the first lens is a convex surface, and an image-side surface of the first lens is a concave surface;
    an object-side surface of the second lens is a convex surface, and an image-side surface of the second lens is a concave surface; and
    an object-side surface and an image-side surface of the sixth lens are both convex surfaces at a paraxial position.
    the total effective focal length f and the entrance pupil diameter EPD satisfy: f/EPD≤1.7.

2. The camera lens assembly according to claim 1, wherein a distance TTL from an object-side surface of the first lens to an image plane of the camera lens assembly on the optical axis and half of a diagonal length ImgH of an effective pixel area on the image plane of the camera lens assembly satisfy: TTL/ImgH≤1.85.

3. The camera lens assembly according to claim 1, wherein

4. The camera lens assembly according to claim 1, wherein the total effective focal length f and an effective focal length f1 of the first lens satisfy: 0.5≤f/f1≤1.0.

5. The camera lens assembly according to claim 1, wherein the total effective focal length f and an effective focal length f5 of the fifth lens satisfy: 0<f/f5<1.0.

6. The camera lens assembly according to claim 1, wherein the total effective focal length f and an effective focal length f7 of the seventh lens satisfy: −2<f/f7<0.

7. The camera lens assembly according to claim 1, wherein an effective focal length f1 of the first lens and an effective focal length f3 of the third lens satisfy: 0<f1/f3<1.0.

8. The camera lens assembly according to claim 1, wherein an effective focal length f1 of the first lens and an effective focal length f4 of the fourth lens satisfy: −1.0≤f1/f4<0.

9. The camera lens assembly according to claim 1, wherein a radius of curvature R3 of the object-side surface of the second lens and a radius of curvature R8 of the image-side surface of the fourth lens satisfy: −1.5<R3/R8<0.

10. The camera lens assembly according to claim 1, wherein a radius of curvature R4 of the image-side surface of the second lens and a radius of curvature R7 of the object-side surface of the fourth lens satisfy: −1.5<R4/R7<−0.5.

11. The camera lens assembly according to claim 1, wherein a radius of curvature R7 of the object-side surface of the fourth lens and a radius of curvature R8 of the image-side surface of the fourth lens satisfy: $|(R7-R8)/(R7+R8)|<1.0$.

\* \* \* \* \*